US010814275B2

(12) United States Patent
Patterson et al.

(10) Patent No.: US 10,814,275 B2
(45) Date of Patent: Oct. 27, 2020

(54) EXHAUST GAS SCRUBBER SYSTEM FOR MULTIPLE SOURCES

(71) Applicant: Belco Technologies Corporation, Parsippany, NJ (US)

(72) Inventors: Wayne A. Patterson, Parsippany, NJ (US); Scott T. Eagleson, Parsippany, NJ (US); Lawrence Gurnari, Parsippany, NJ (US); Melanie Davidson, Parsippany, NJ (US); Marco Dierico, Quarto d'Altino (IT); Wei Li, Wilmington, DE (US)

(73) Assignee: Belco Technologies Corporation, Parsippany, NJ (US)

( * ) Notice: Subject to any disclaimer, the term of this patent is extended or adjusted under 35 U.S.C. 154(b) by 0 days.

(21) Appl. No.: 15/322,898

(22) PCT Filed: May 25, 2016

(86) PCT No.: PCT/US2016/034019
§ 371 (c)(1),
(2) Date: Dec. 29, 2016

(87) PCT Pub. No.: WO2017/151167
PCT Pub. Date: Sep. 8, 2017

(65) Prior Publication Data
US 2018/0154309 A1 Jun. 7, 2018

Related U.S. Application Data

(60) Provisional application No. 62/303,183, filed on Mar. 3, 2016.

(51) Int. Cl.
*B01D 53/92* (2006.01)
*F01N 9/00* (2006.01)
(Continued)

(52) U.S. Cl.
CPC ............. *B01D 53/92* (2013.01); *B01D 53/77* (2013.01); *F01N 3/04* (2013.01); *F01N 3/0807* (2013.01);
(Continued)

(58) Field of Classification Search
CPC ......... B01D 53/92; F01N 3/04; F01N 3/0807; F01N 3/20; F01N 3/28
See application file for complete search history.

(56) References Cited

U.S. PATENT DOCUMENTS

| 3,413,803 A | 12/1968 | Rosenlund et al. |
| 5,178,653 A | 1/1993 | Liija et al. |

(Continued)

FOREIGN PATENT DOCUMENTS

| CN | 101314106 A | 12/2008 |
| KR | 20110129160 A * | 12/2011 |

(Continued)

OTHER PUBLICATIONS

English Translation of KR 20110129160 (Year: 2011).*

(Continued)

*Primary Examiner* — Anthony Ayala Delgado
(74) *Attorney, Agent, or Firm* — Stinson LLP

(57) ABSTRACT

A scrubber system for cleaning exhaust gas from different engines. The scrubber system includes a scrubber, such as a wet scrubber, for removing a constituent from the gas and a housing having an inlet for receiving the gases into the scrubber and an outlet for discharging cleaned gas. An exhaust mixer has plural inlets for receiving exhaust gas from the different engines and an outlet for discharging the gases into the scrubber through the inlet. The exhaust mixer mixes the exhaust gases into a combined flow stream exiting the exhaust mixer outlet. The scrubber system can clean exhaust gases from different engines by connecting exhaust (Continued)

pipes from each engine to a respective inlet, mixing the exhaust gases in the mixer, and directing the mixed gases into the scrubber, which cleans and discharges the cleaned, mixed gases. The scrubber system can be provided to a marine vessel.

20 Claims, 31 Drawing Sheets

(51) Int. Cl.
    *F01N 3/28*     (2006.01)
    *F01N 3/20*     (2006.01)
    *B01D 53/77*     (2006.01)
    *F01N 3/04*     (2006.01)
    *F01N 3/08*     (2006.01)

(52) U.S. Cl.
    CPC ............... *F01N 3/20* (2013.01); *F01N 3/28* (2013.01); *F01N 9/00* (2013.01); *B01D 2259/4566* (2013.01)

(56) References Cited

U.S. PATENT DOCUMENTS

| | | | |
|---|---|---|---|
| 5,248,859 A * | 9/1993 | Borla | F01N 1/04 181/238 |
| 8,439,156 B1 * | 5/2013 | Abram | F01N 1/16 181/212 |
| 8,834,016 B1 | 9/2014 | Richie et al. | |
| 2013/0213231 A1 * | 8/2013 | Hoy-Petersen | B01D 53/502 95/216 |
| 2013/0228074 A1 * | 9/2013 | Patterson | B01D 53/18 95/226 |
| 2013/0283768 A1 | 10/2013 | Sputh et al. | |
| 2015/0231567 A1 | 8/2015 | Golin et al. | |

FOREIGN PATENT DOCUMENTS

| | | |
|---|---|---|
| KR | 20110129160 A | 12/2011 |
| KR | 10-1205358 | 11/2012 |
| KR | 10-1431077 | 8/2014 |
| WO | 2006/048506 A1 | 5/2006 |
| WO | 2012117980 A1 | 9/2012 |
| WO | 2015/064452 A1 | 5/2015 |

OTHER PUBLICATIONS

International Written Opinion of related application PCT/US2016/034019 dated Sep. 1, 2016.
International Search Report of related application PCT/US2016/034019 dated Sep. 1, 2016.
ABS. Exhaust Gas Scrubber Systems, Status and Guidance dated Mar. 22, 2013. <URL: http://ww2.eagle.org/content/dam/eagle/publications/2013/Scrubber_Advisory.pdf>.
Alfa Laval PureSOx: Exhaust gas cleaning for competitive SOx compliance; 2018.
First Office issued for Chinese Application No. 201680001844.5, dated May 12, 2020, 15 pages.
Communication Pursuant to Article 94(3) EPC for European Application No. 16 810 225.9, dated Jul. 9, 2020, 7 pages.

* cited by examiner

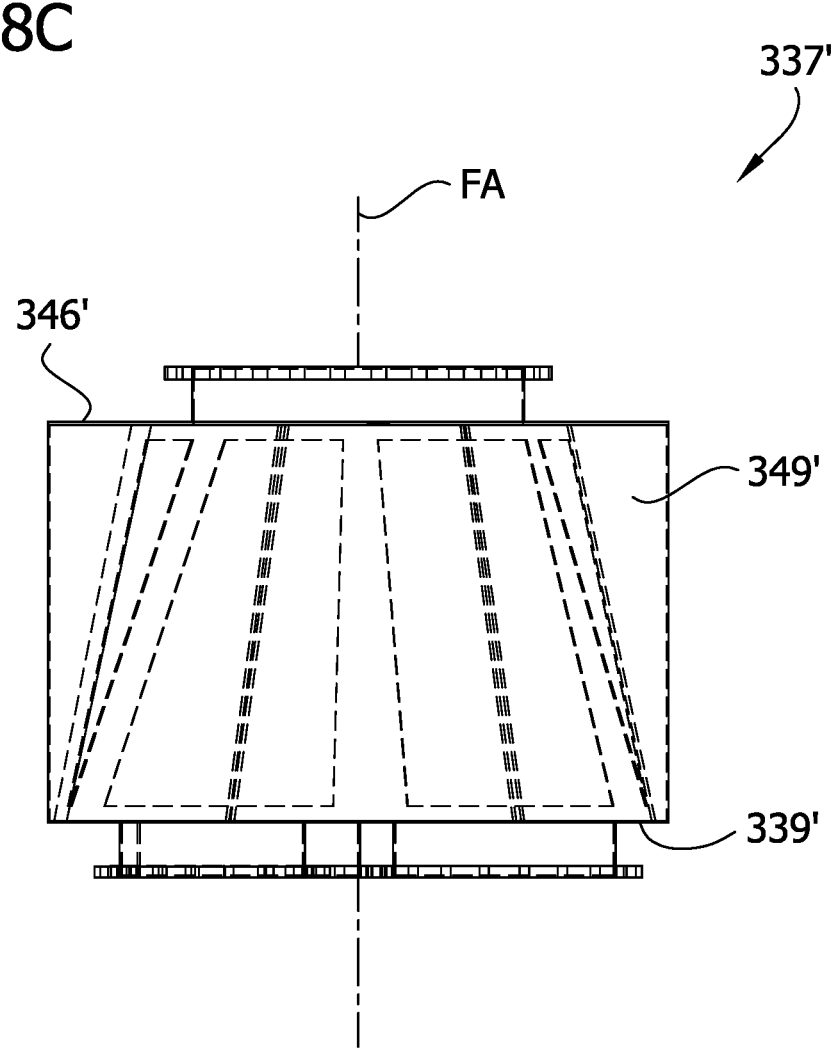

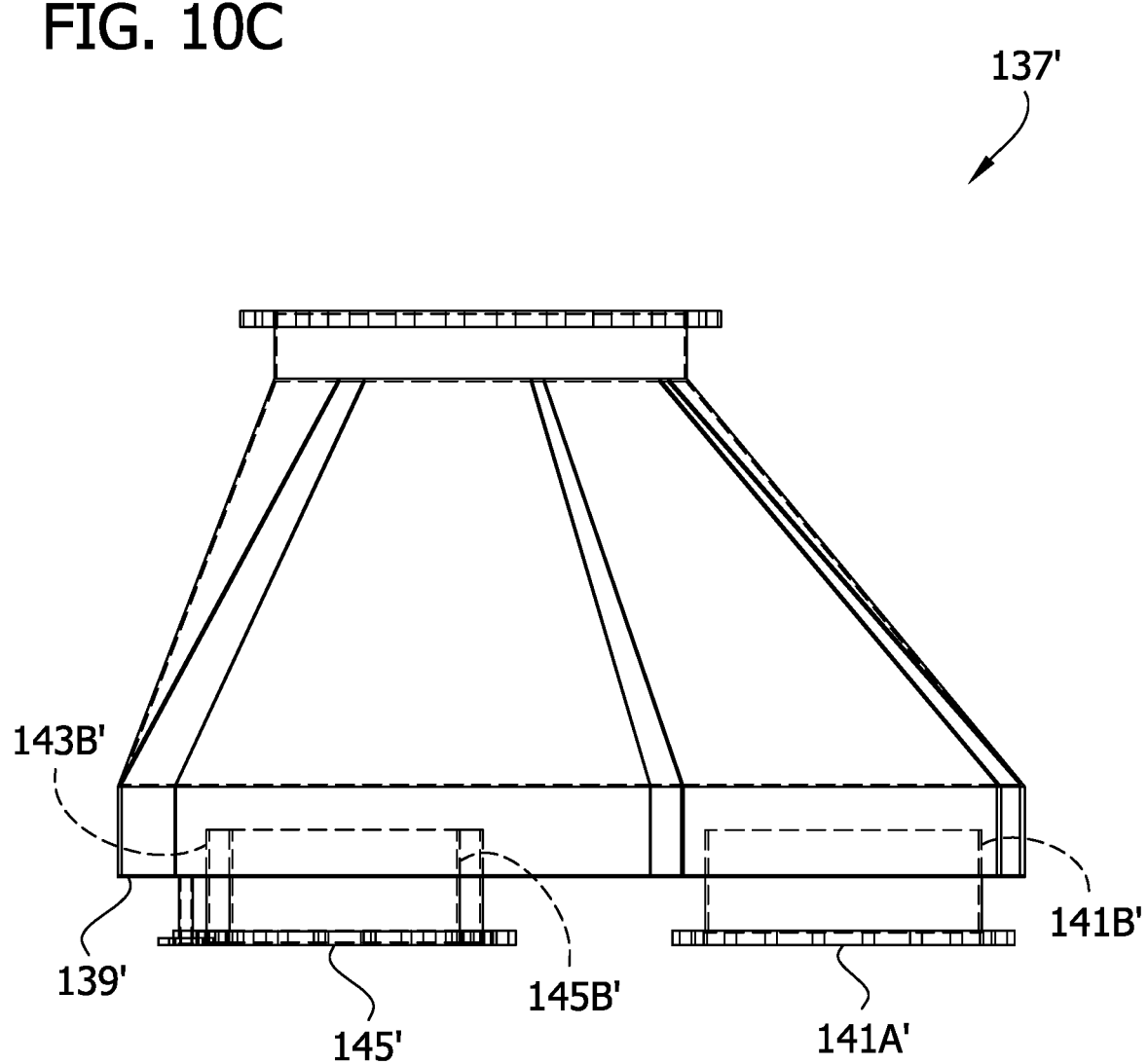

US 10,814,275 B2

EXHAUST GAS SCRUBBER SYSTEM FOR MULTIPLE SOURCES

FIELD

The present disclosure generally relates to scrubbing exhaust gas prior to introduction into the environment, and more particularly to a scrubber system for cleaning exhaust gas from multiple sources using a single scrubber.

BACKGROUND

The need to reduce the amount of pollutants emitted in exhaust gas from engines is well understood. This is reflected by increasingly stringent environmental regulations. For example, the International Chamber of Shipping (ICS) has currently proposed regulations to reduce the permitted sulphur content in marine fuel to 0.5%. Coastal areas of northwest Europe and North America already have emission control areas that require use of fuel having a sulphur content of no more than 0.1%. However, the availability of fuels with such low sulphur content is not sufficiently widespread. An option is to use a scrubber to clean the exhaust to remove pollutants such as $SO_2$ from the exhaust gas where fuel is used having a higher sulphur content. Space in a marine vessel is at a premium. In a retrofit circumstance, there is typically no design consideration for accommodating one or more scrubbers. Even in new ship design, space for engines and any exhaust handling must be kept to a minimum. In many cases there are multiple engines that may emit exhaust gas that requires cleaning.

SUMMARY

In one aspect, a scrubber system for receiving and cleaning exhaust gas from different engines comprises a scrubber for removing at least one constituent from the exhaust gas. The scrubber includes a housing having an inlet for receiving exhaust gases into the scrubber and an outlet for discharging cleaned exhaust gas from the scrubber. An exhaust mixer has plural inlets configured to receive exhaust gas from the different engines at a location remote from each of the different engines into the exhaust mixer and an outlet for discharging exhaust gas from the exhaust mixer. The exhaust mixer outlet is configured for connection in fluid communication with the inlet of the scrubber for delivering exhaust gas from the exhaust mixer into the scrubber. The exhaust mixer is configured to mix the exhaust gases entering through the inlets into a combined flow stream exiting the exhaust mixer outlet.

In another aspect, a method of cleaning exhaust gases from distinct engines using a single scrubber comprises connecting exhaust pipes from respective ones of the distinct exhaust gas sources to an exhaust mixer. The exhaust gases are mixed in the exhaust mixer into a combined gas flow stream. The combined gas flow stream is directed into the scrubber. The combined gas flow stream is cleaned in the scrubber. And the cleaned, combined gas flow stream is discharged from the scrubber.

In another aspect, a method of providing a marine vessel with a scrubber system for cleaning exhaust gases from distinct engines comprises placing an in-line scrubber in a funnel of the marine vessel. An exhaust mixer is located in the marine vessel at a location below the in-line scrubber. The exhaust mixer is connected to an inlet of the scrubber located on a bottom of the scrubber. Exhaust pipes from distinct engines are connected to the exhaust mixer.

Other aspects and features will be pointed out and/or apparent hereinafter.

BRIEF DESCRIPTION OF THE DRAWINGS

FIG. 8C is a side elevation of the exhaust mixer of FIG. 8A;

FIG. 10C is a side elevation of the exhaust mixer of FIG. 10A;

Corresponding reference characters indicate corresponding parts throughout the drawings.

DETAILED DESCRIPTION

Figure 1:
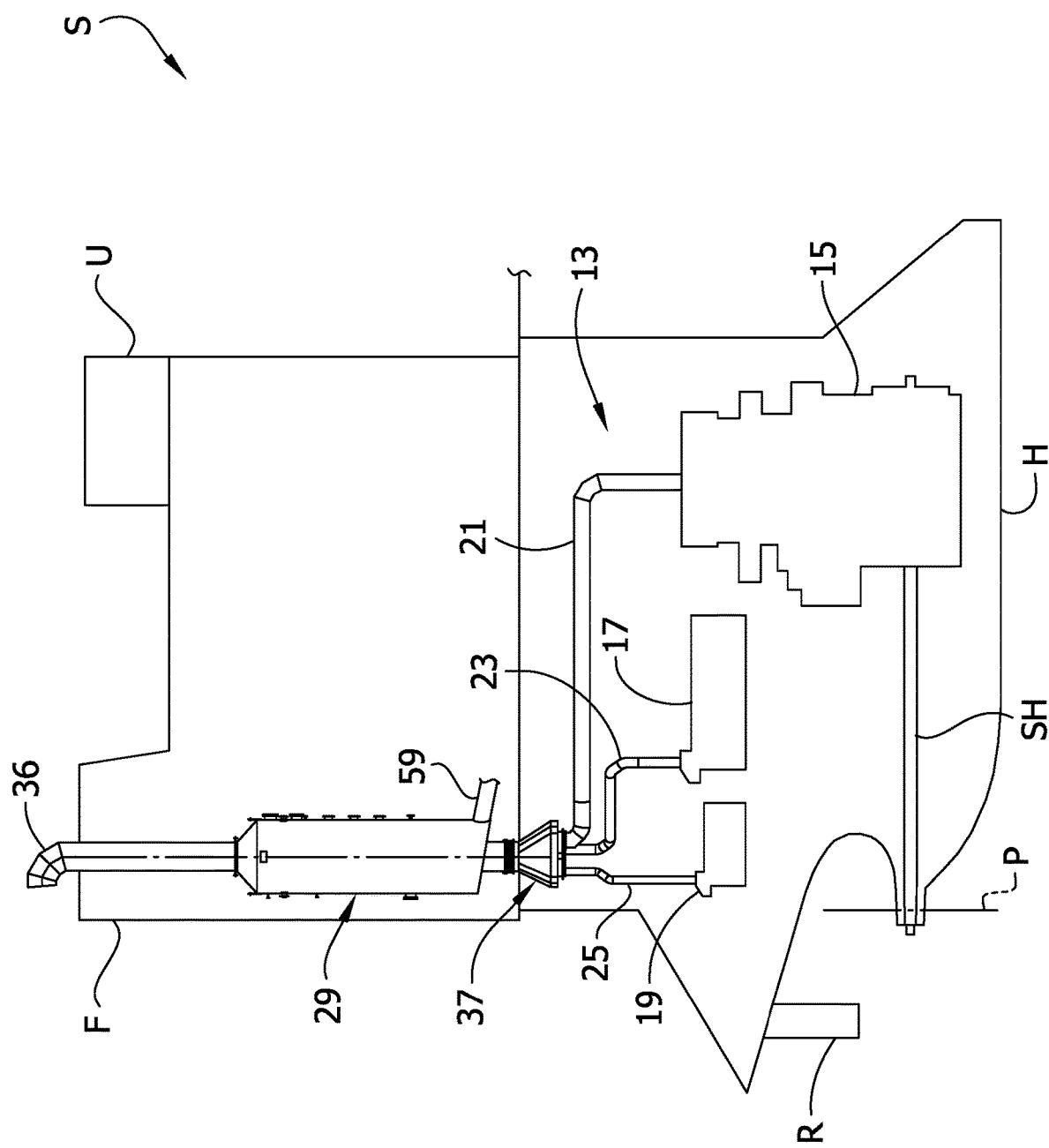
FIG. 1 is a schematic showing a scrubber system and engines as installed in a stern of a ship.

Referring now to the drawings, and in particular to FIG. 1, a stern section of a ship S (broadly, "a marine vessel") is shown in phantom as the structure in which a scrubber system constructed according to the principles of the present invention is generally indicated by reference numeral 11. The illustrated portion of the ship S includes a superstructure U, a funnel F, a hull H, which is broken away forward of the superstructure, a rudder R, a propeller P and a shaft SH mounting the propeller on the hull. A power generation system 13 of the ship S is mounted within the hull H includes a main engine 15, a first auxiliary engine 17 and a second auxiliary engine 19. The main engine 15 is a diesel engine and is connected to the shaft SH for driving rotation of the propeller P. The first and second auxiliary engines 17, 19 are also diesel engines that can be used for electrical power generation, backup or in other ways understood by those of ordinary skill in the art. Other sources of exhaust gas may be attached to the scrubber system 11. For example and without limitation, instead of an internal combustion engine, the source of exhaust gas could be a boiler. Internal combustion engines, boilers and other heat engines are broadly considered "engines." The engines 15, 17, 19 are connected to the scrubber system 11 for cleaning the exhaust of the engines prior to be discharged to the atmosphere at the funnel F. The main engine 15 is connected to the scrubber system 11 by an exhaust pipe 21. The first auxiliary engine is connected to the scrubber system 11 by an exhaust pipe 23. The second auxiliary engine 19 is connected to the scrubber system 11 by an exhaust pipe 25. It will be understood that the number, the type, the location and/or use of engines may be other than described without departing from the scope of the present invention. The scrubber system 11 of the present invention has particular application for cleaning the exhaust from multiple sources, as will be explained in more detail hereinafter.

Figure 3:
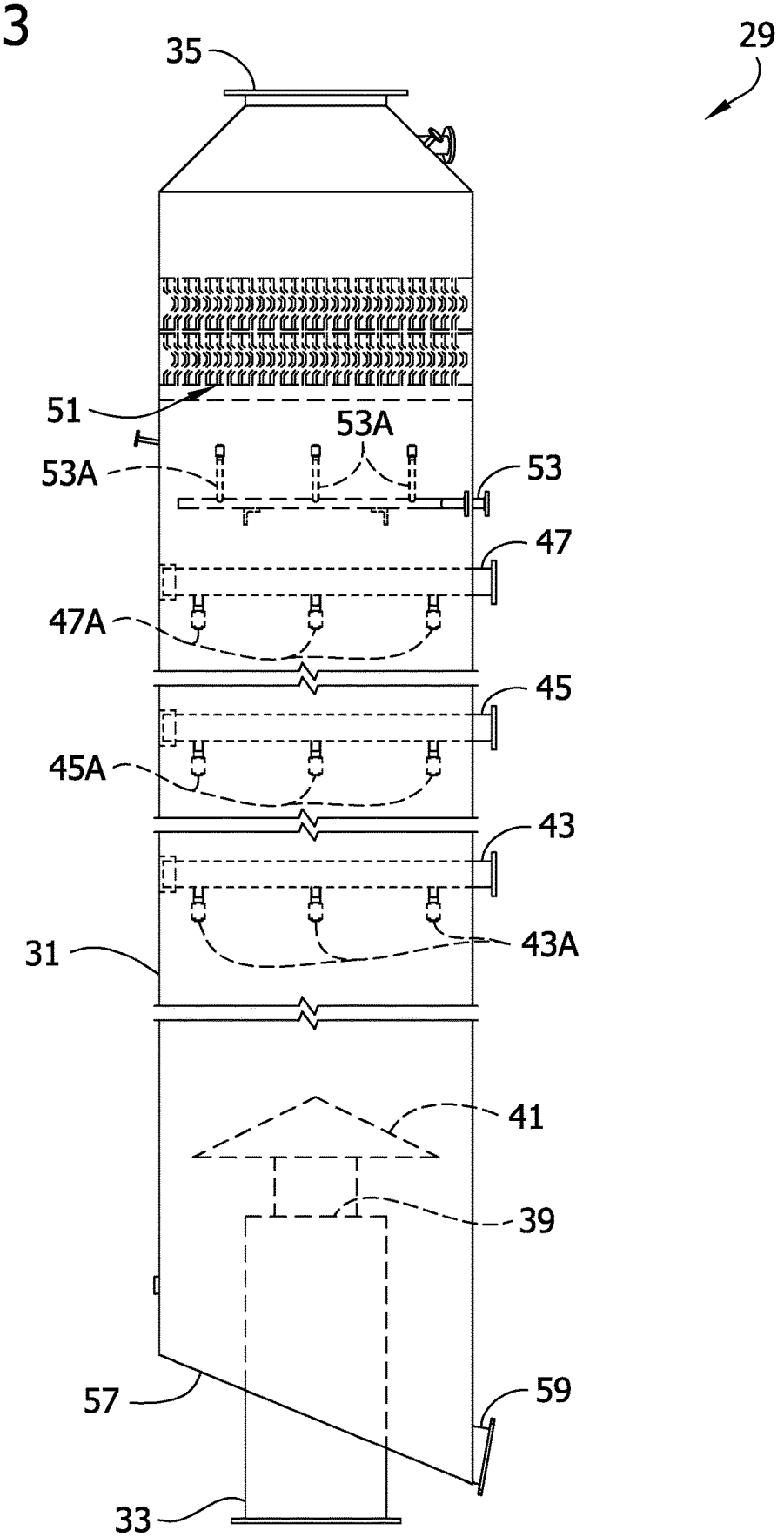
FIG. 3 is a schematic illustration of an in-line scrubber of the scrubber system of FIG. 1.

The scrubber system 11 includes an in-line, wet scrubber 29 located in the funnel F of the ship S. Referring to FIG. 3, the scrubber 29 includes a generally cylindrical housing 31 having an inlet fitting 33 at a first (bottom) longitudinal end of the scrubber housing and an outlet fitting 35 at a second, opposite (top) longitudinal end of the scrubber housing. Parts of the housing 31 are broken to reduce the height of the scrubber 29 for illustration. The overall shape of the scrubber 29 and its normal (vertical) operating position make it ideal for use in the ship S. The elongate configuration of the scrubber 29 corresponds closely to the configuration of the funnel F. The scrubber 29 can fit in the place conventionally used for a silencer (not shown). The scrubber 29 can function to silence engine noise, thereby replacing the function of the silencer. The slender configuration of the scrubber 29 and of the overall scrubber system 11 also facilitates the installation of more than one scrubber in the funnel F, should that be required. All three of the exhaust pipes 21, 23, 25 are attached to the inlet fitting 33 by an exhaust mixer 37 (FIG. 1), described more fully hereinafter. The exhaust mixer 37 is mounted directly on the scrubber inlet fitting 33. All three engines 15, 17, 19 are serviced by one scrubber 29. This arrangement has, among other advantages, the saving of space within the funnel F, as compared to providing a separate scrubber for each engine. The outlet fitting 35 may be connected to a discharge stack 36 for release of cleaned exhaust gas to the atmosphere.

Internal components of the scrubber 29 are shown in hidden lines in FIG. 3. The inlet fitting 33 extends into the interior of the housing and opens in the interior at a mouth 39. The mouth is covered by a diverter cap 41 that prevents water used in the scrubber 29 from entering the mouth 39. A lower absorber spray head 43, a middle absorber spray head 45 and an upper absorber spray head 47 each include nozzles (designated 43A, 45A and 47A, respectively) to spray water within the scrubber housing 31. A droplet separator 51 is located near the top of the housing 31 to capture entrained water droplets. The droplet separator 51 includes rows of curved pieces (sometimes called "chevrons" for their general shape) that define tortuous paths for scrubbed exhaust gas leaving the scrubber facilitating water droplet removal. A wash sprayer 53 located under the droplet separator 51 can be periodically activated to spray water or other solution through nozzles 53A for cleaning the chevrons forming the droplet separator. A heat exchanger (not shown) or hot air injector may also be provided near the outlet fitting 35 to heat the exiting exhaust gas for reducing a water vapor plume leaving the scrubber system. In one embodiment, the internal components are constructed so that the scrubber 29 can run dry. The internal components in that embodiment are sufficiently robust as to withstand hot exhaust gas not cooled by any water flowing within the scrubber 29. However, the scrubber 29 may not be constructed to run dry within the scope of the present invention. In general, it will be understood that the construction and operation of the scrubber 29 may be other than described without departing from the scope of the present invention. For example, and without limitation, the scrubber may be a dry scrubber (not shown) that does not use water or other liquid and contains packing for removing pollutants from the exhaust flow.

In use hot, dirty exhaust gas from one or more of the engines 15, 17, 19 enters the inlet fitting 33 of the scrubber 29 and exits the mouth 39 within the scrubber housing 31. In some instances, the entering exhaust gas might be on the order of 350° C. The diverter cap 41 alters the flow of exhaust gas from a generally vertical direction to a generally lateral direction. The diverter cap 41 also redirects water coming down from the lower, middle and upper absorber spray heads 43, 45, 47 laterally off of the sides of the diverter cap. The hot exhaust moving out from under the diverter cap 41 passes through a curtain of water around the diverter cap. A substantial amount of water is evaporated so that much of the heat of the exhaust gas entering the scrubber 29 is removed immediately upon entry into the interior of the scrubber housing 31. The quenched gas and entrained water flows upward from the diverter cap 41 in the housing 31. In addition to providing further cooling of the exhaust gas, the water captures particulates in the gas. A reagent may be added to the water sprayed from the lower, middle and upper absorber spray heads 43, 45, 47 to promote the absorption of a particular pollutant by the water. For example, a reagent may be added to promote absorption of $SO_2$. It will be understood that the particulates and $SO_2$ are considered "constituents" of the exhaust gas. Water droplets entrained in the gas flow passing above the upper absorber spray head 47 encounter the droplet separator 51. The changes in direction of the gas flows passing through the tortuous paths defined by the chevrons of the droplet separator 51 promotes collection of water droplets from the gas flow on the surfaces of the chevrons. Collected water on the chevrons may fall down toward the bottom of the scrubber housing 31. Water containing particulates and $SO_2$ from the droplet separator 51 and from the lower, middle and upper absorber spray heads 43, 45, 47 falls down within the scrubber housing 31 to a slanted floor 57 at the bottom of the housing. The floor 57 is located well below the mouth 39 of the inlet fitting 33 to inhibit water collected at the bottom of the housing from entering the inlet fitting. A drain outlet 59 is located on the lowest side of the slanted floor 57 to permit dirty liquid to exit the scrubber 29.

Figure 2A:
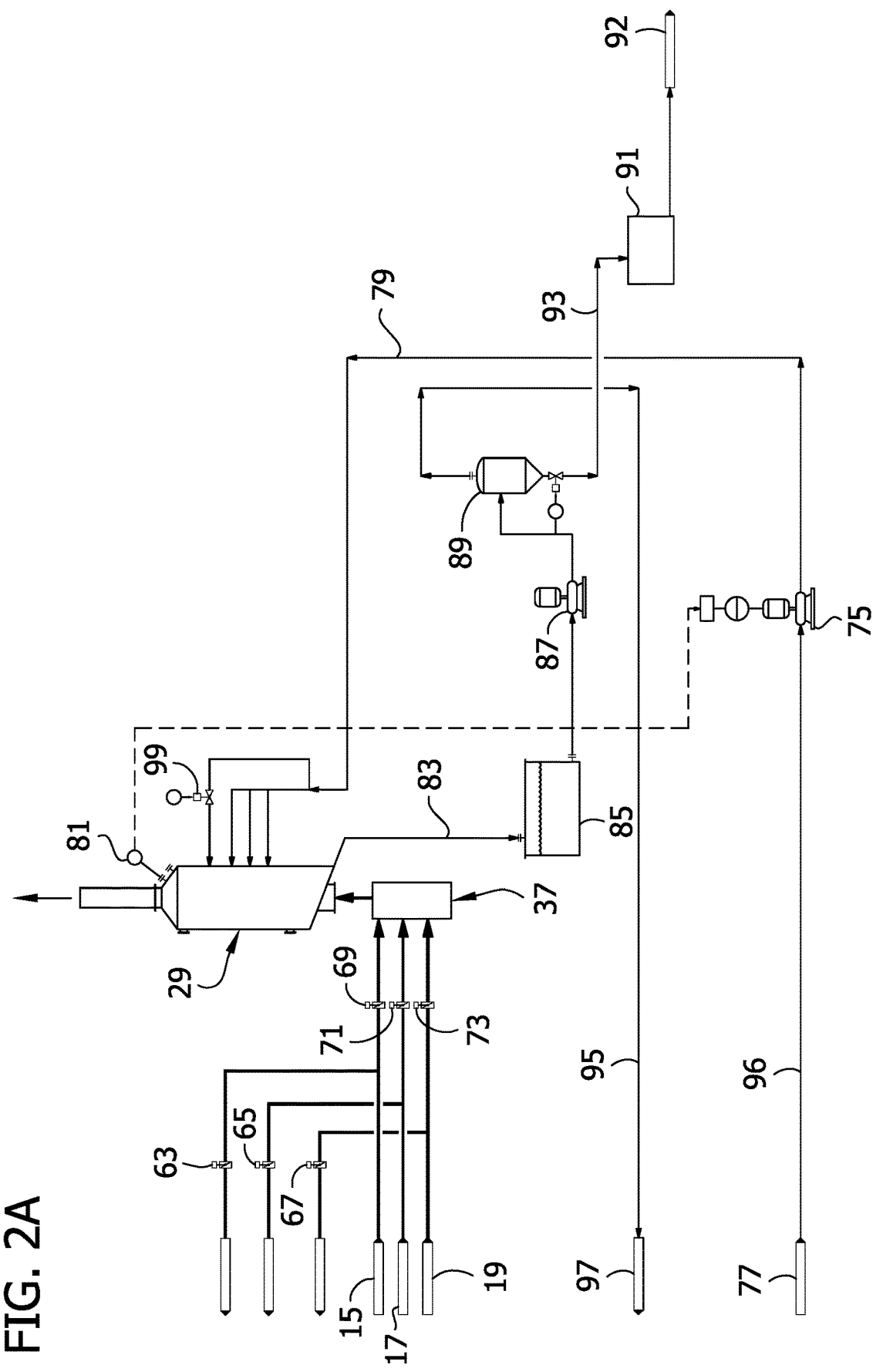
FIG. 2A is a process flow diagram of an open loop scrubber system.

Referring now to FIG. 2A, additional details of the scrubber system 11 separated from the scrubber 29 are shown. The scrubber system 11 of FIG. 2A is illustrated as an open loop system. In this embodiment, the engines 15, 17, 19 each have an optional bypass line controlled by a respective valve 63, 65, 67 that permits the scrubber system 11 to be bypassed. Shut off valves 69, 71, 73 close off the exhaust mixer 37 from the exhaust gas leaving the engines 15, 17, 19, and work in concert with the bypass valves 63, 65, 67 to achieve bypass of the scrubber system 11. An economizer or economizers (not shown) may be located just upstream from the exhaust mixer 37 to recover heat from the engines 15, 17, 19. An economizer may additionally or alternatively be located downstream of the exhaust mixer 37 to recover heat from the engines 15, 17, 19.

A variable flowrate circulation pump 75 can draw water to be used by the scrubber 29 from the ship's sea chest, diagrammatically illustrated at 77. The sea chest may have water from the sea, river, lake or other body of water. The pump 75 delivers water to the lower, middle and upper absorber spray heads 43, 45, 47 (see, FIG. 3), and also to the wash sprayer 53 in the scrubber 29 by way of line 79. A valve 99 controlled by a timer periodically feeds water from the line 79 into the wash sprayer 53 (see, FIG. 3). A sensor 81 near the outlet fitting 35 of the scrubber 29 measures the ratio of $SO_2$ to $CO_2$. The measurement of this ratio is used to control the flowrate of the pump 75, as indicated by the dashed line connecting the sensor 81 to the pump. If the ratio goes up, the speed or flowrate of the pump 75 is increased. Similarly, if the ratio of $SO_2$ to $CO_2$ goes down the flowrate from the pump 75 may be reduced automatically. Other sensors, such as a pH sensor (not shown) may also be used in control of aspects of the scrubber system 11. Water containing particulates and absorbed $SO_2$ leaving the scrubber 29 through the drain outlet 59 (not shown in FIG. 2A) passes through drain conduit 83 to a residence tank 85. A hydrocyclone pump 87 draws liquid from the residence tank and feeds it to a hydrocyclone separation vessel 89. Particulate is separated from wash water in the hydrocyclone vessel 89, concentrated as sludge and delivered from the bottom of the hydrocyclone vessel to a sludge storage tank 91 via line 93. Sludge can be offloaded from the ship S to a disposal receptacle 92, when the ship is docked. Wash water exits the top of the hydrocyclone vessel 89 where it can be treated and delivered through line 95 back to the sea at 97. Sea water has an alkalinity that makes it a good medium for removing $SO_2$. Accordingly, no reagent to aid in absorbing $SO_2$ is needed, particularly where the sea water is used only once before being returned to the ocean.

Figure 2B:
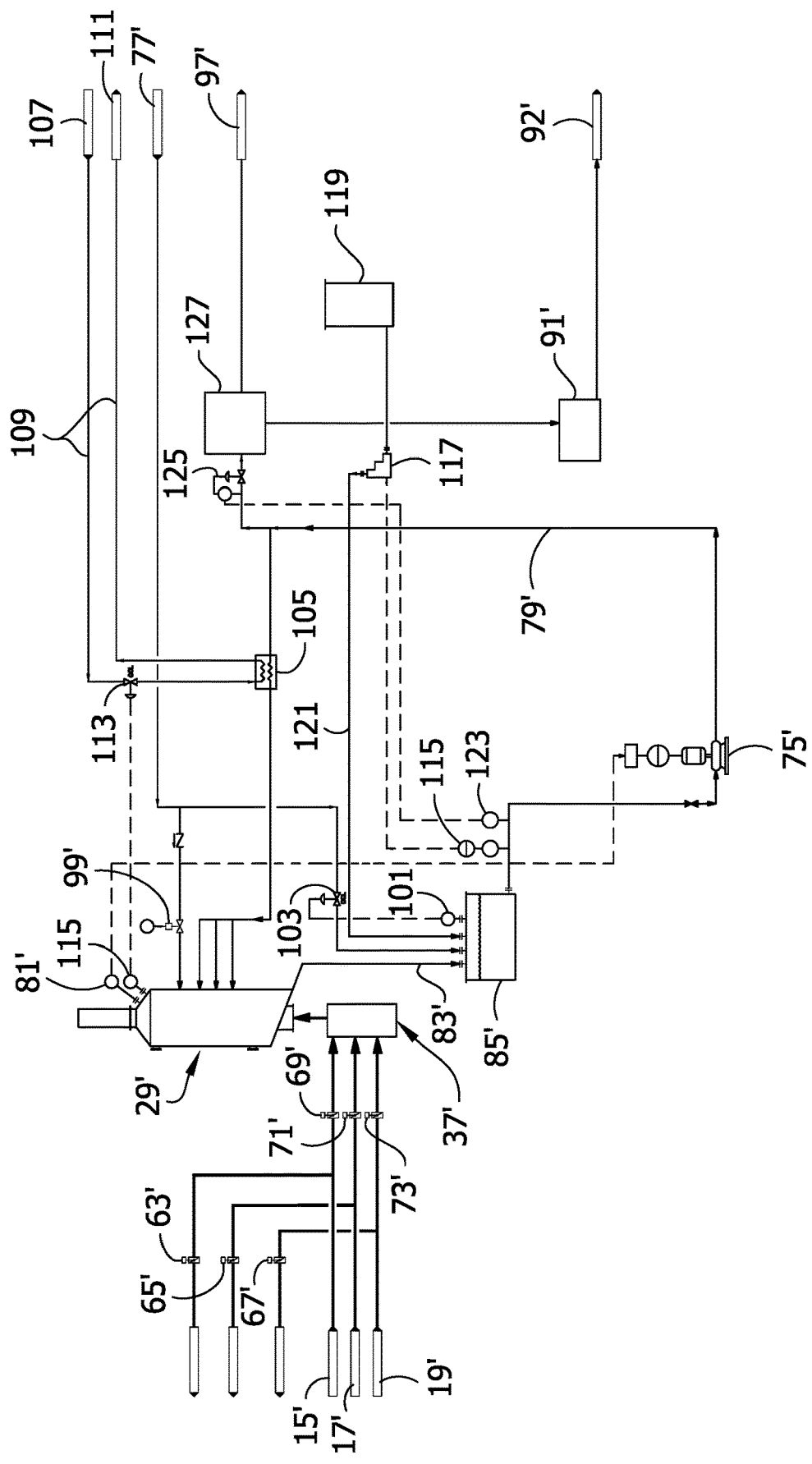
FIG. 2B is a process flow diagram of a closed loop scrubber system.

A scrubber system 11' shown in FIG. 2B is a closed loop system. Parts of the scrubber system 11' corresponding to the parts of the scrubber system 11 shown in FIG. 2A will be designated with the same reference numeral, with the addition of a following prime. The parts that have essentially the same function as in the open loop configuration of FIG. 2A will not be described again in detail for the closed loop configuration of FIG. 2B. A circulation pump 75' draws water for a scrubber 29' from a residence tank 85', instead of from the ship's sea chest 77'. In this embodiment, the circulation pump 75' supplies water from the residence tank 85' only to the lower, middle and supper absorber spray heads 43, 45, 47 (not shown in FIG. 2B). The wash sprayer 53 is fed by make-up water from the sea chest 77' via line 96 using a pump (not shown). Make up water from the sea chest 77' is also supplied on demand to the residence tank 85'. A valve 99' is controlled by a timer for periodically delivering water to the wash sprayer 53. Demand for make-up water to the residence tank 85' is controlled by a level sensor 101 on the residence tank' used to operate a valve 139. Liquid in the residence tank 85' will have been heated by the exhaust gases in the scrubber 29' and could be less effective in removing heat from the exhaust gas when recycled through the scrubber. Accordingly, water circulated from the residence tank 85' to the lower, middle and upper absorber spray heads 43, 45, 47 through line 79' may be cooled in a heat exchanger 105, though which the line 79' passes. Coolant from a supply designated 107 can be in the form the sea, river, lake or other body of water. The coolant can be delivered through line 109 to the heat exchanger 105 and then discharged after it has removed heat from the water in line 79' at a cooling water outlet 111. The amount of cooling water delivered to the heat exchanger 105 is regulated by a valve 113 that is controlled by a temperature sensor 115 on the scrubber 29'. The temperature sensor 115 detects the temperature of the cleaned exhaust gas exiting the scrubber 29'. More cooling water is supplied to the heat exchanger 105 as the temperature of the cleaned exhaust gas measured by the temperature sensor 115 rises. Less water is used if the cleaned exhaust gas temperature falls.

Reuse of the water that leaves the scrubber 29' by drain conduit 83' to feed the lower, middle and upper absorber spray heads 43, 45, 47 requires monitoring of the reused water. A pH sensor 115 monitors water drawn from the residence tank 85' by the pump 75'. Absorption of $SO_2$ over time causes the pH of the water to fall. To offset this, a reagent is added to the water in the residence tank 85' when the pH sensor 115 detects a sufficiently low pH in the water drawn from the residence tank by pump 75'. More specifically, the pH sensor 116 activates a reagent pump 117 to deliver reagent from a storage tank 119 through line 121 to the residence tank 85'. Any suitable reagent may be used, and in one instance NaOH is used as a reagent to promote continued absorption of $SO_2$ in the scrubber 29' by water recycled from the residence tank 85'. Absorption of $SO_2$ and reactions with the reagent also causes an increase the total dissolved salts in the water of the residence tank 85' when the water is reused. A total dissolved salts sensor 123 can detect this in water leaving the residence tank 85' and cause a valve 125 to open for purging water from the line 79' to a wash water treatment unit 127. Particulate is separated from the water in the wash water treatment unit 127 and concentrated as sludge. Sludge is delivered from the wash water treatment unit 127 to a sludge storage tank 91'. Separated water is cleaned and then discharged to the sea, river, lake or other body of water by way of discharge outlet 97'. In the closed loop scrubber system 11', less water is taken from and reintroduced into the body of water in operation.

Figure 5:
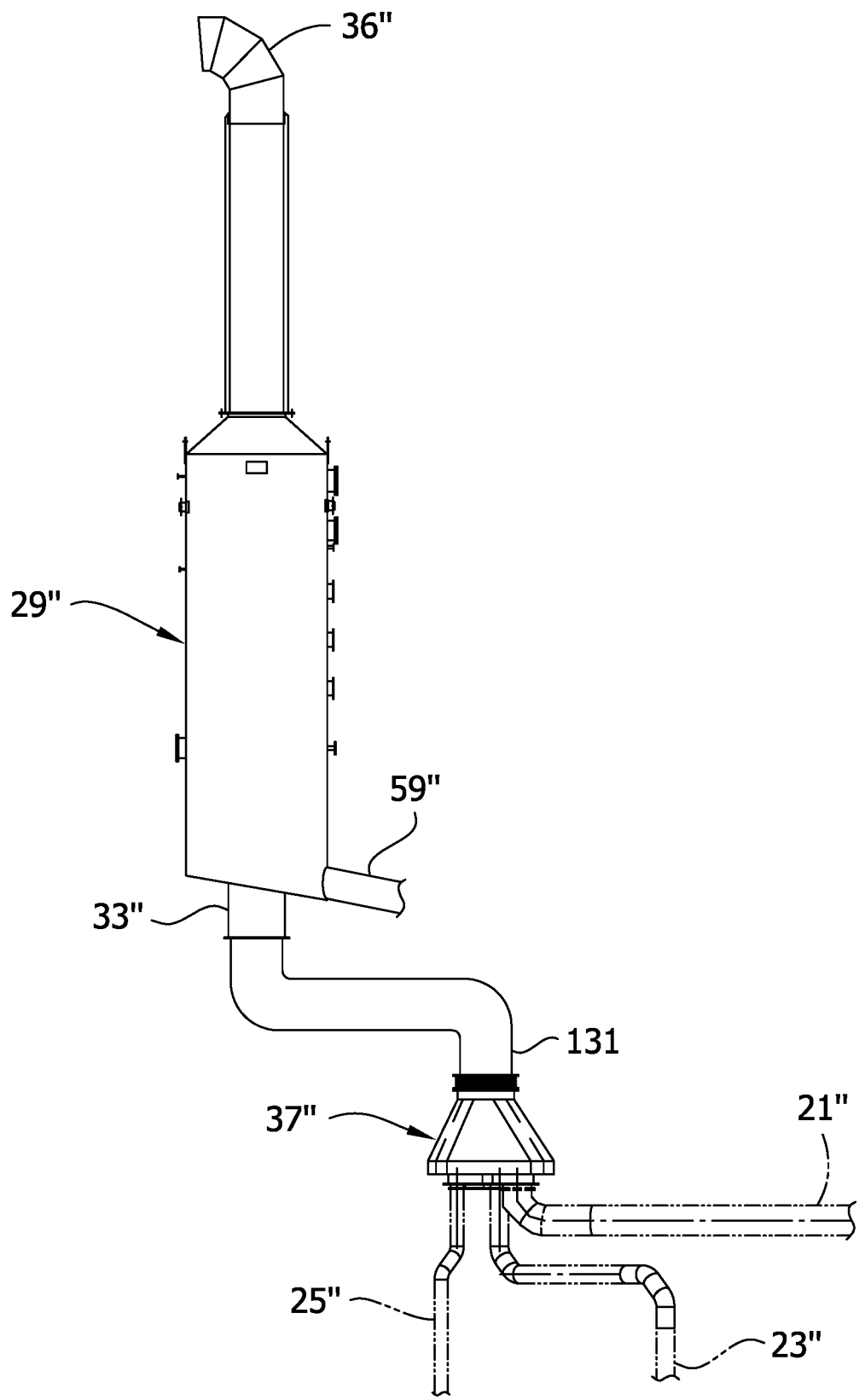
FIG. 5 is an elevation view showing a scrubber system having a different arrangement of a scrubber and exhaust mixer.
Figure 6A:
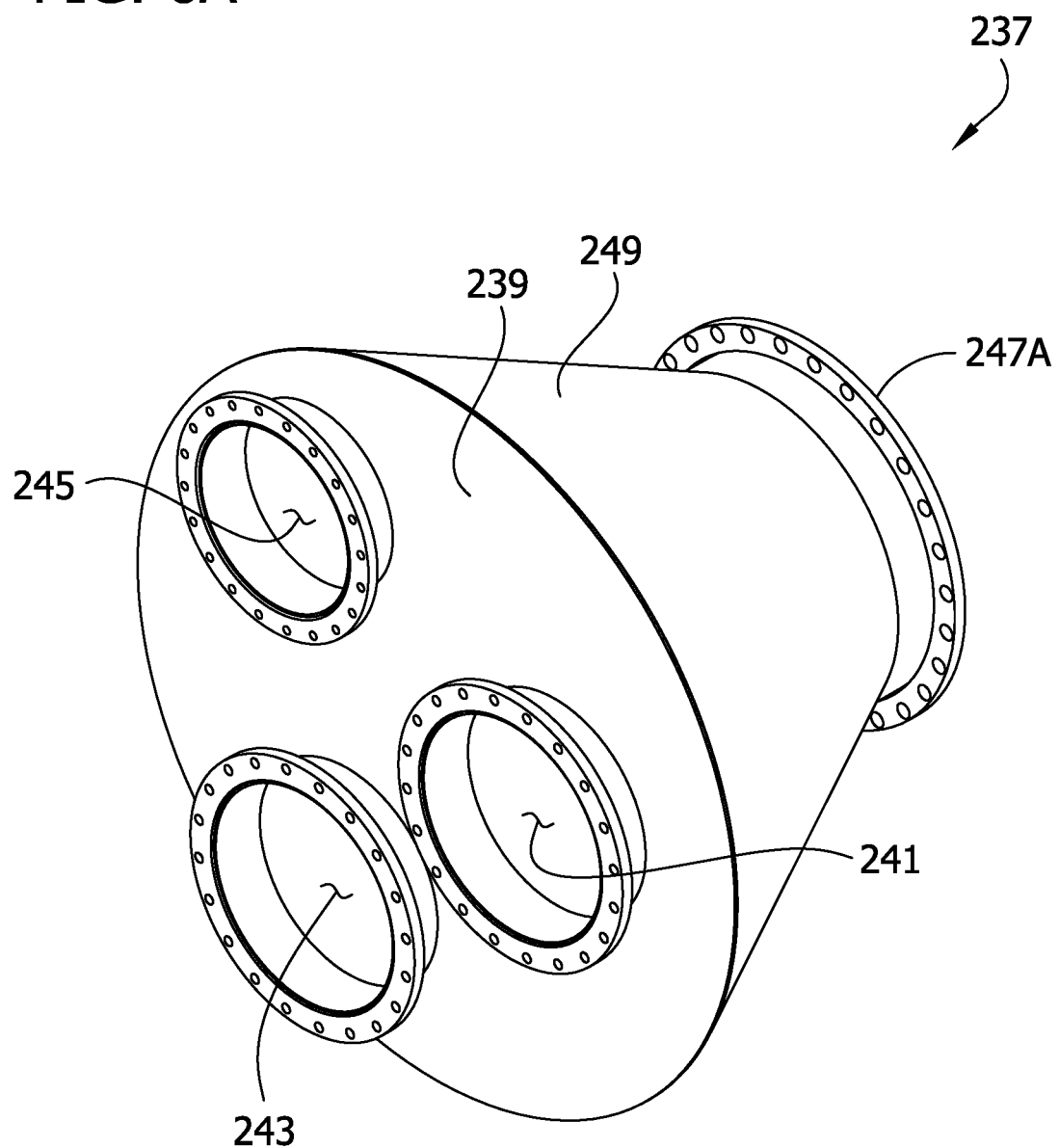
FIG. 6A is a perspective of another exhaust mixer.
Figure 6B:
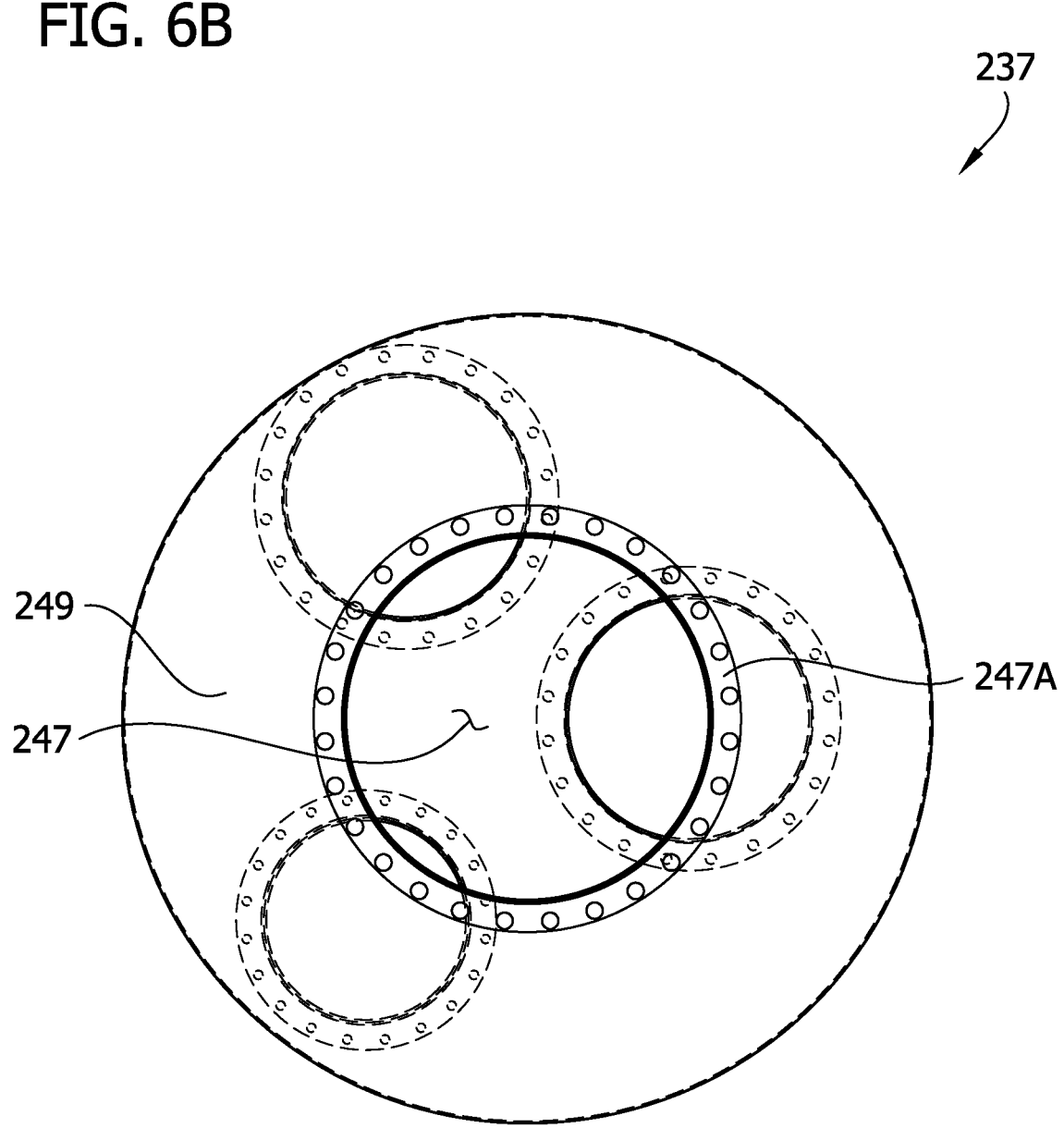
FIG. 6B is a top plan view of the exhaust mixer of FIG. 6A.
Figure 6C:
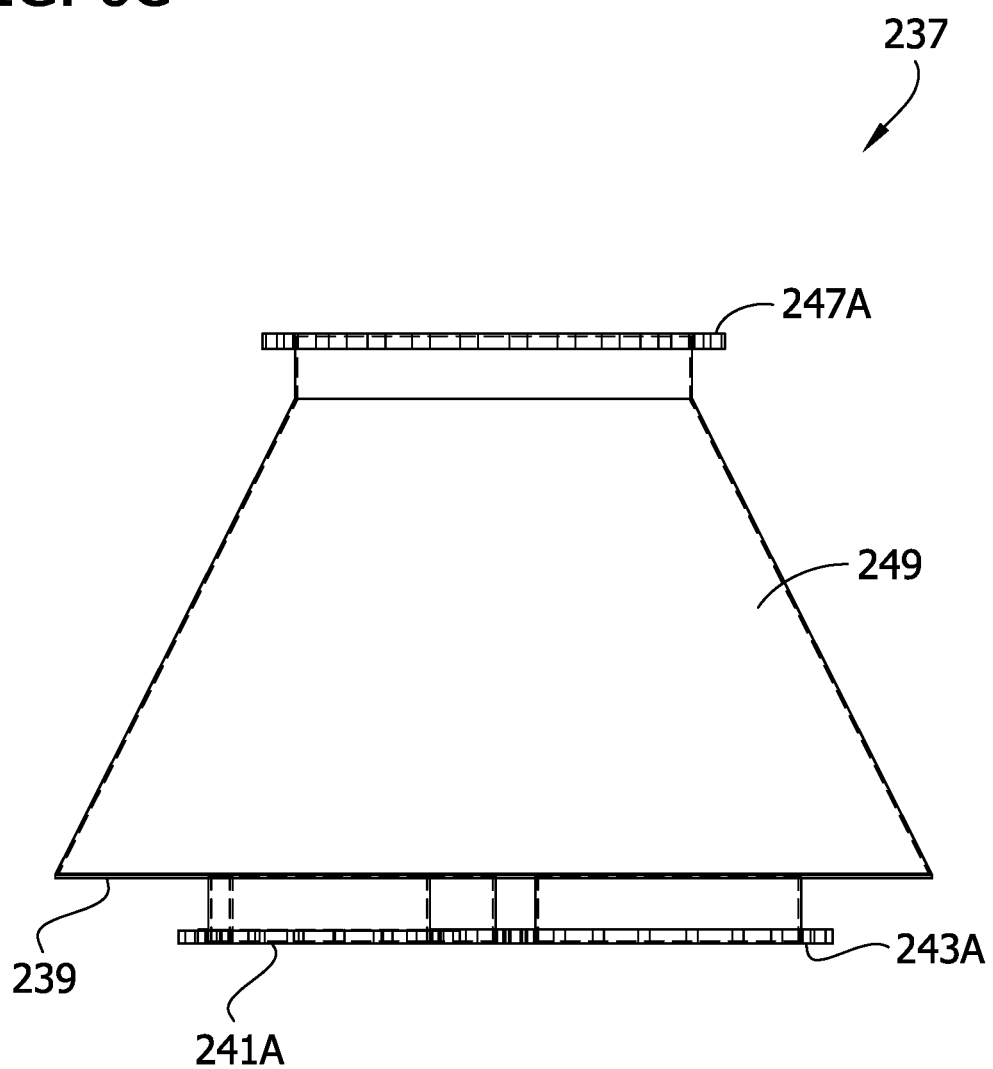
FIG. 6C is a side elevation of the exhaust mixer of FIG. 6A.
Figure 6D:
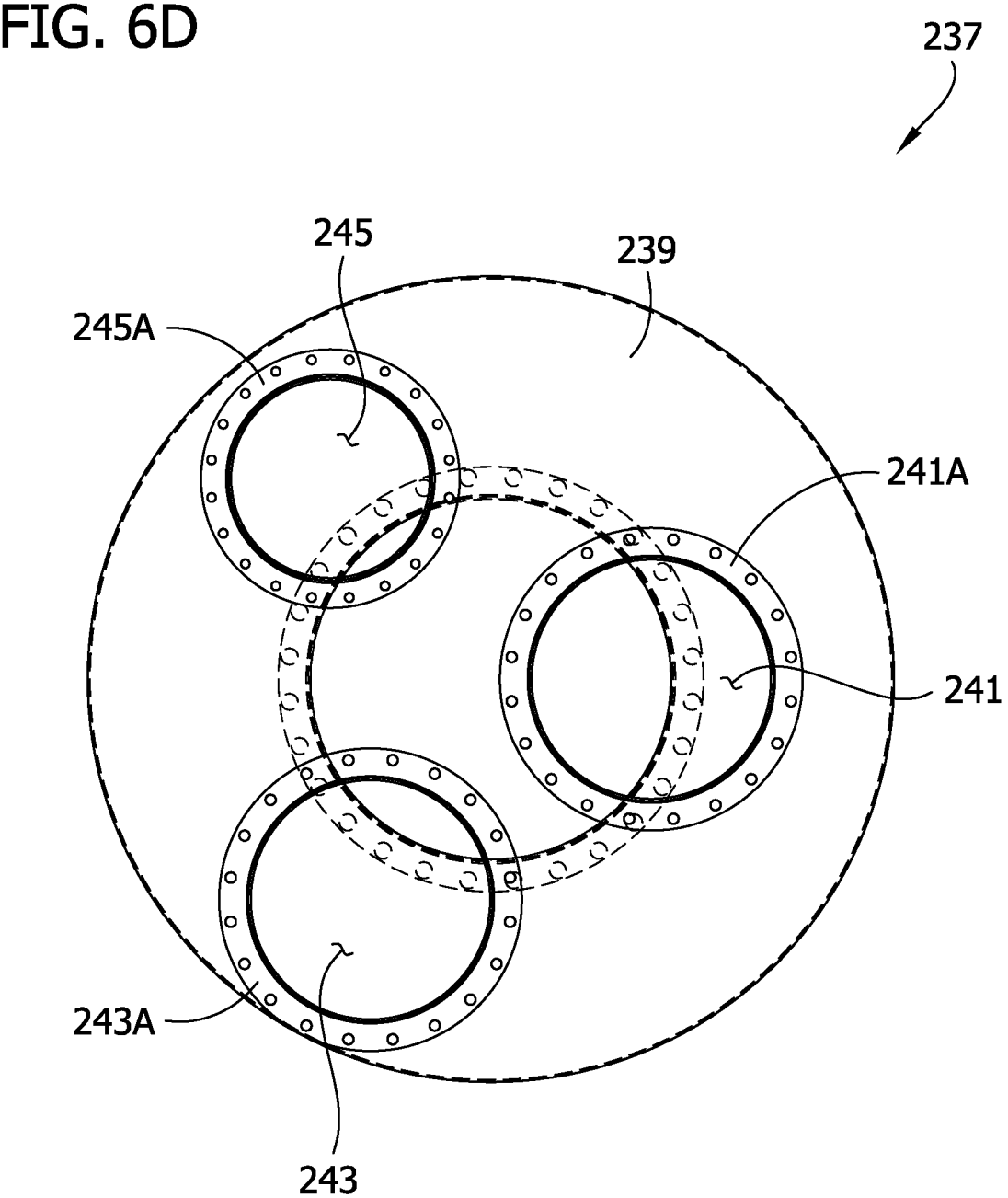
FIG. 6D is a bottom plan view of the exhaust mixer of FIG. 6A.
Figure 7A:
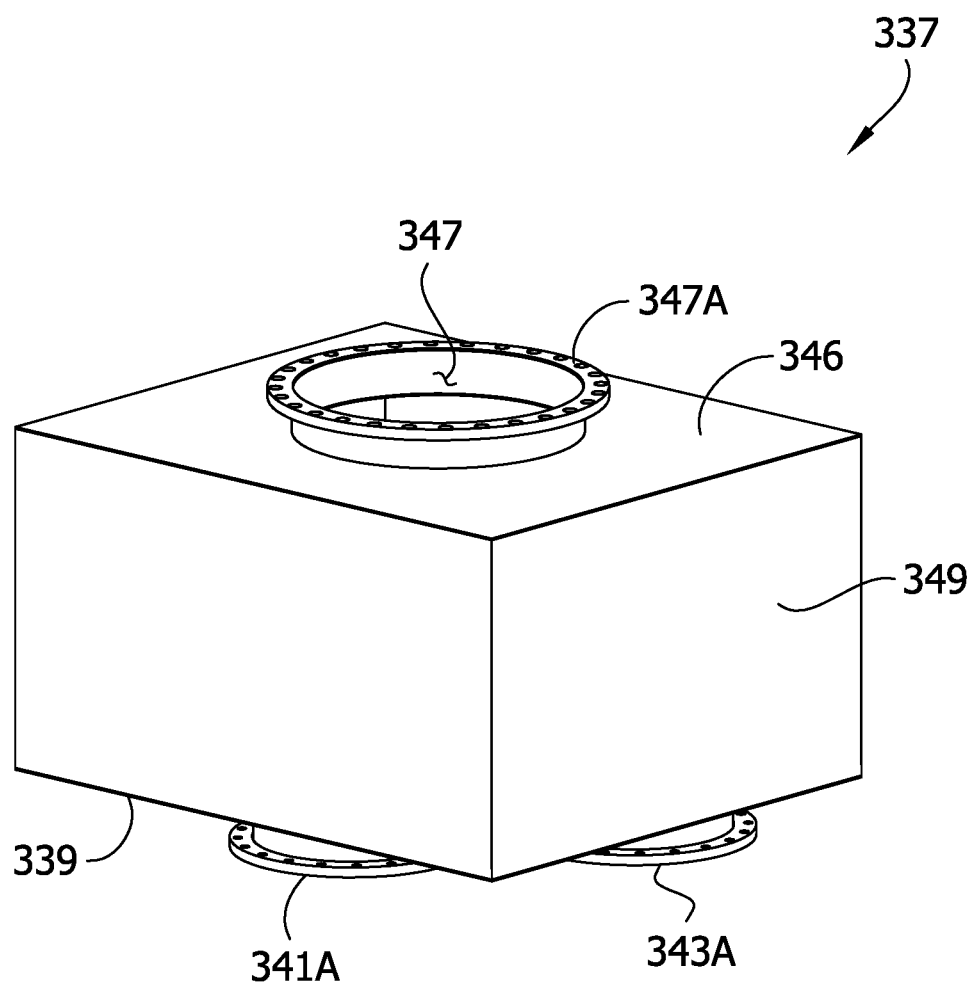
FIG. 7A is a perspective of another exhaust mixer.
Figure 7B:
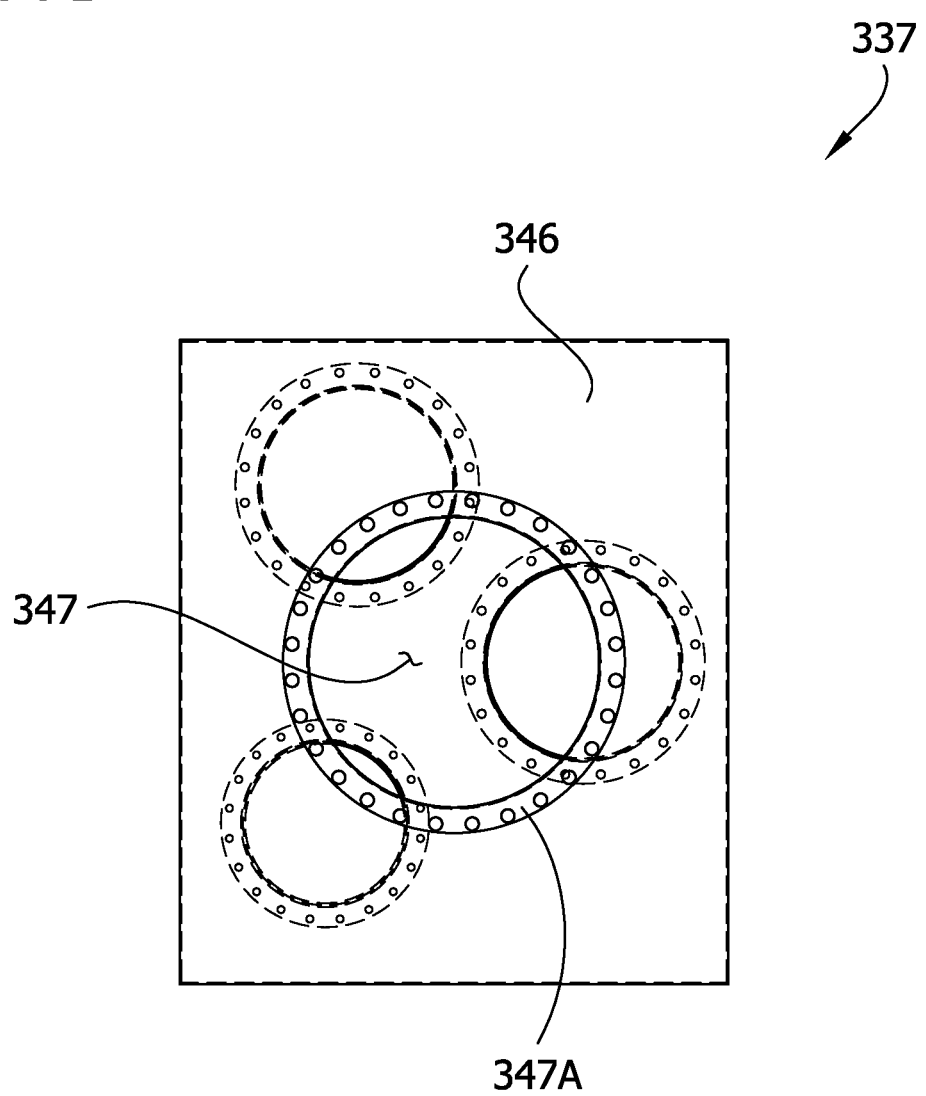
FIG. 7B is a top plan view of the exhaust mixer of FIG. 7A.
Figure 7C:
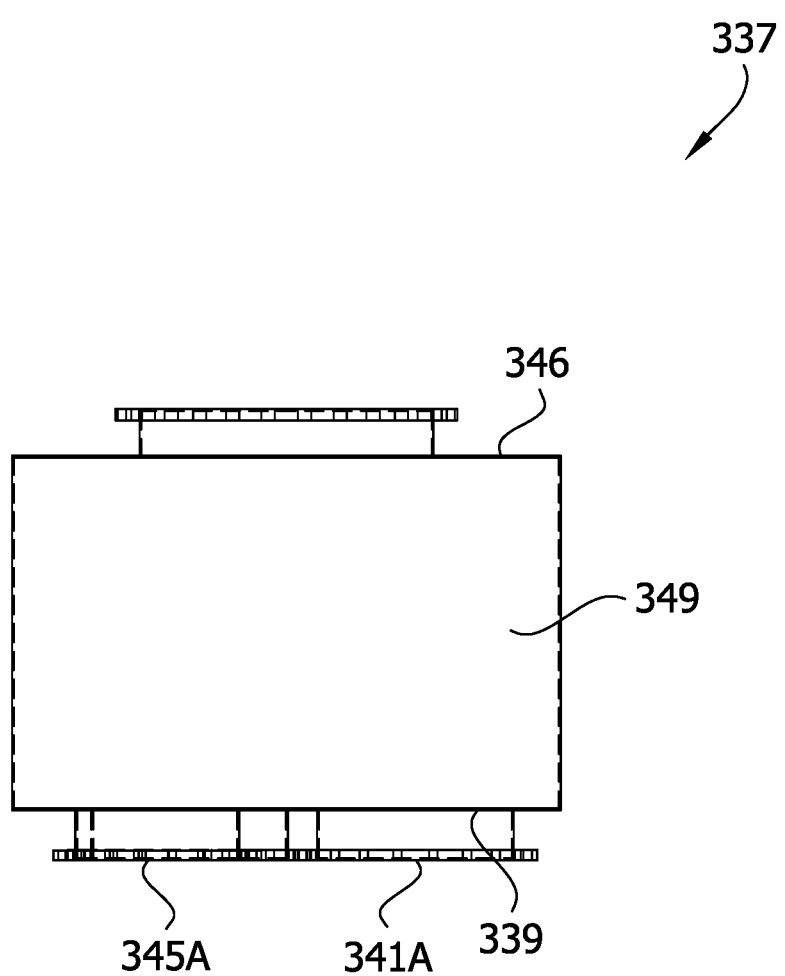
FIG. 7C is a side elevation of the exhaust mixer of FIG. 7A.
Figure 7D:
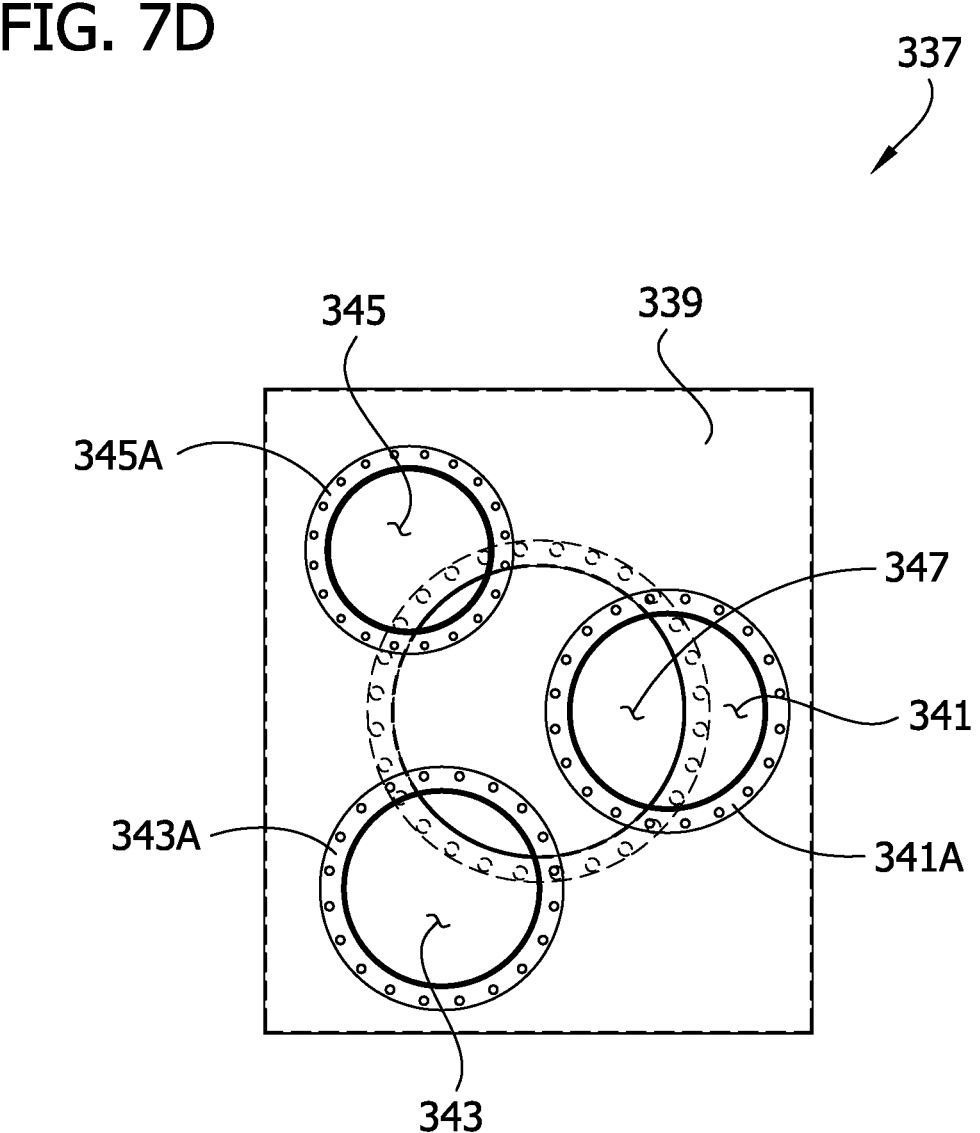
FIG. 7D is a bottom plan view of the exhaust mixer of FIG. 7A.
Figure 8A:
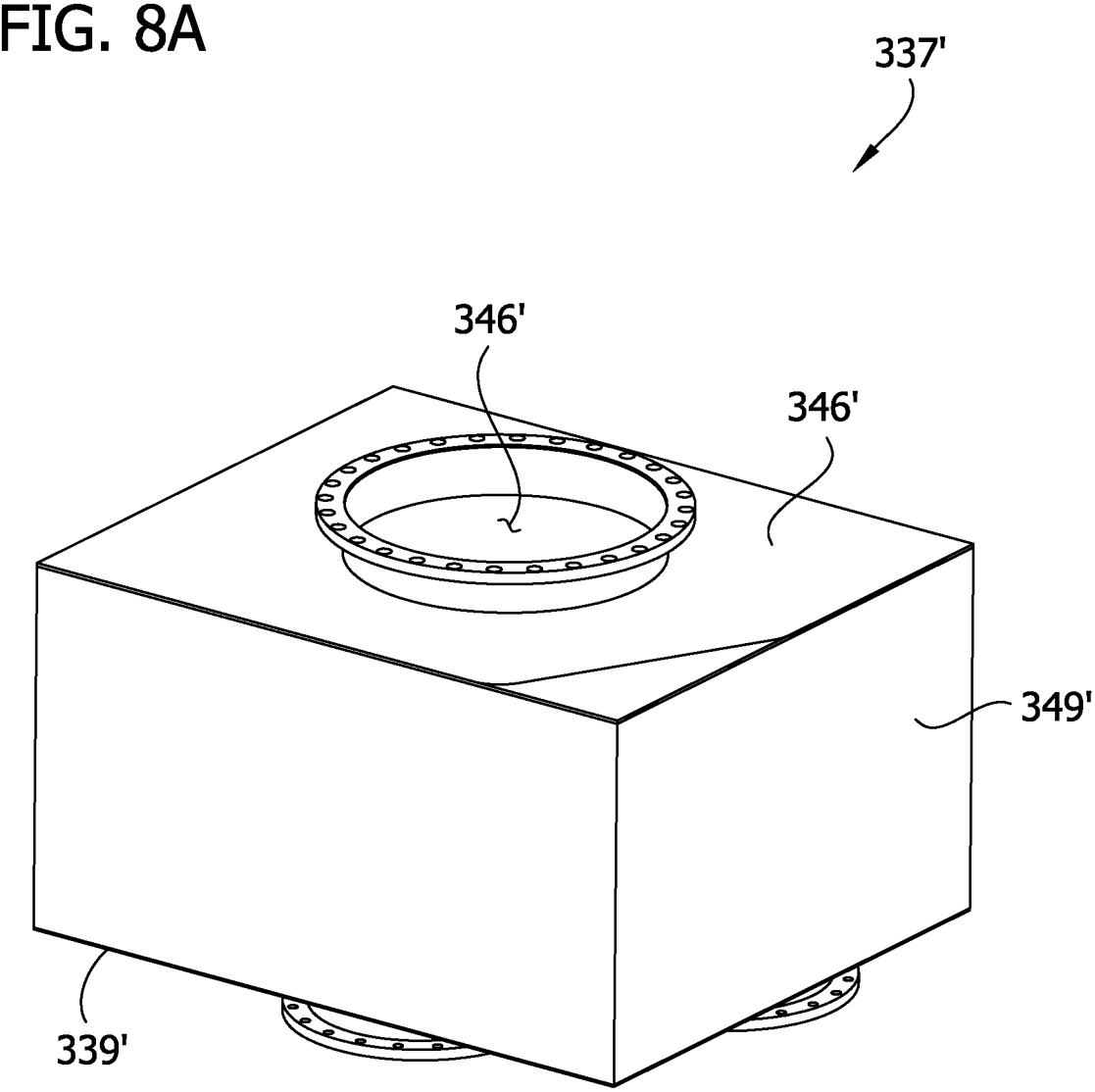
FIG. 8A is a perspective of another exhaust mixer.
Figure 8B:
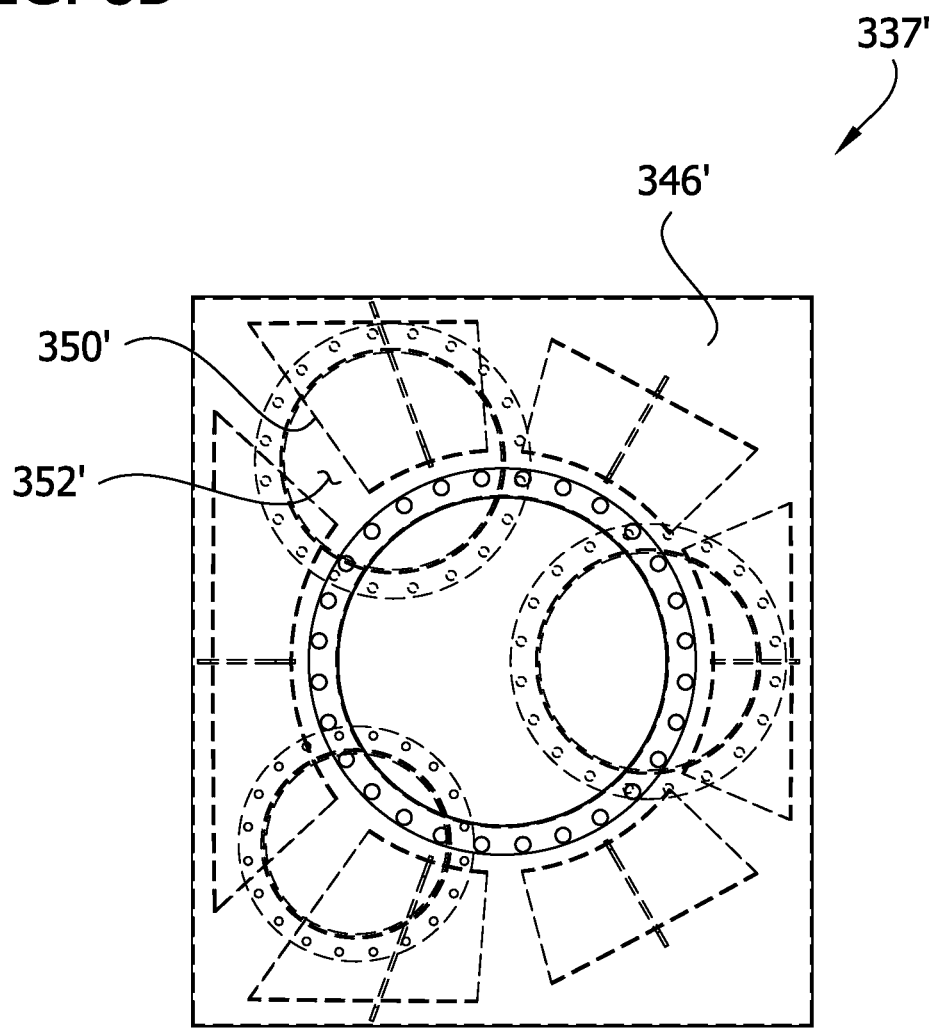
FIG. 8B is a top plan view of the exhaust mixer of FIG. 8A.
Figure 8D:
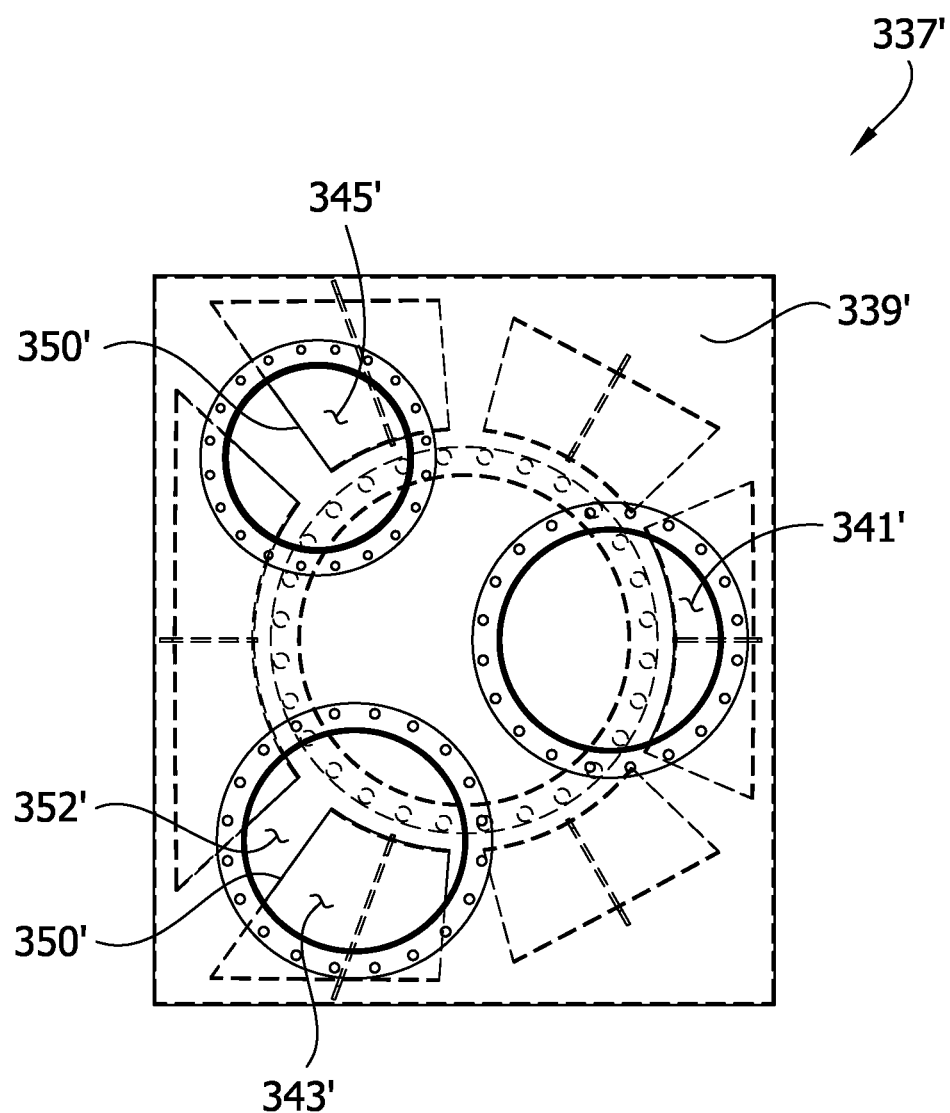
FIG. 8D is a bottom plan view of the exhaust mixer of FIG. 8A.
Figure 8E:
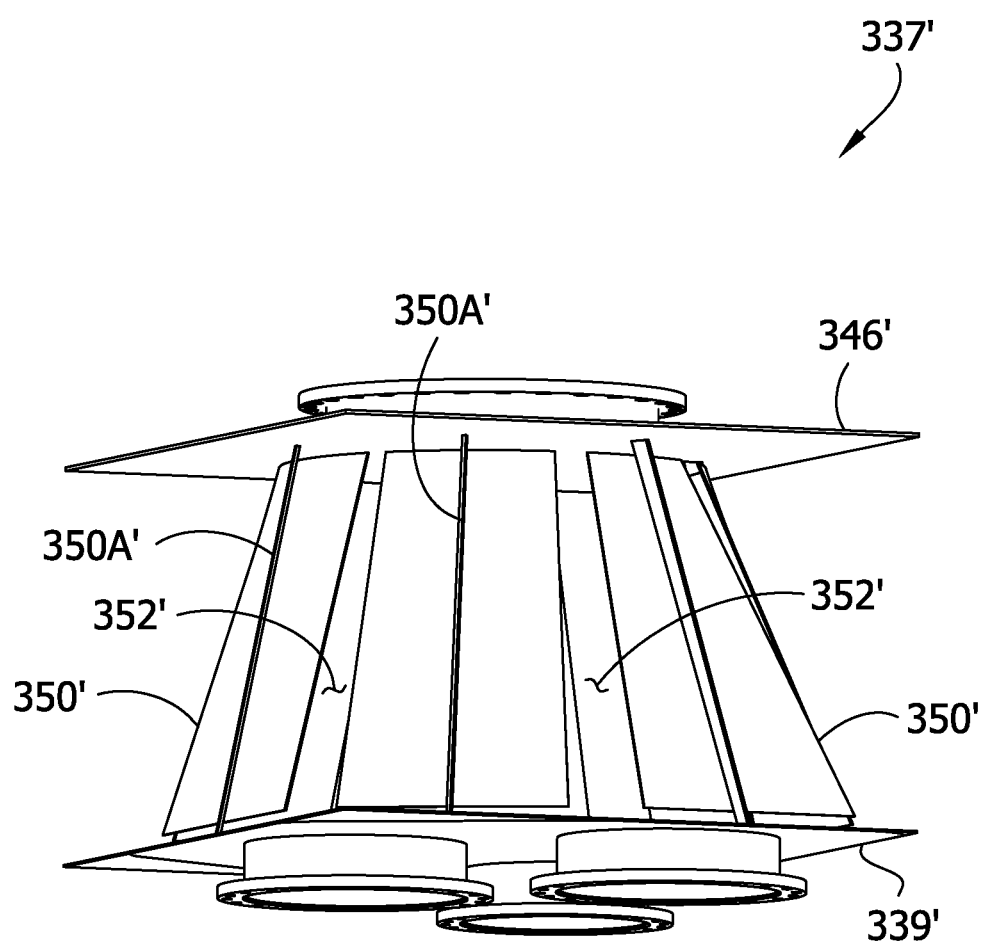
FIG. 8E is a perspective of the exhaust mixer of FIG. 8A with a side wall thereof removed.
Figure 9A:
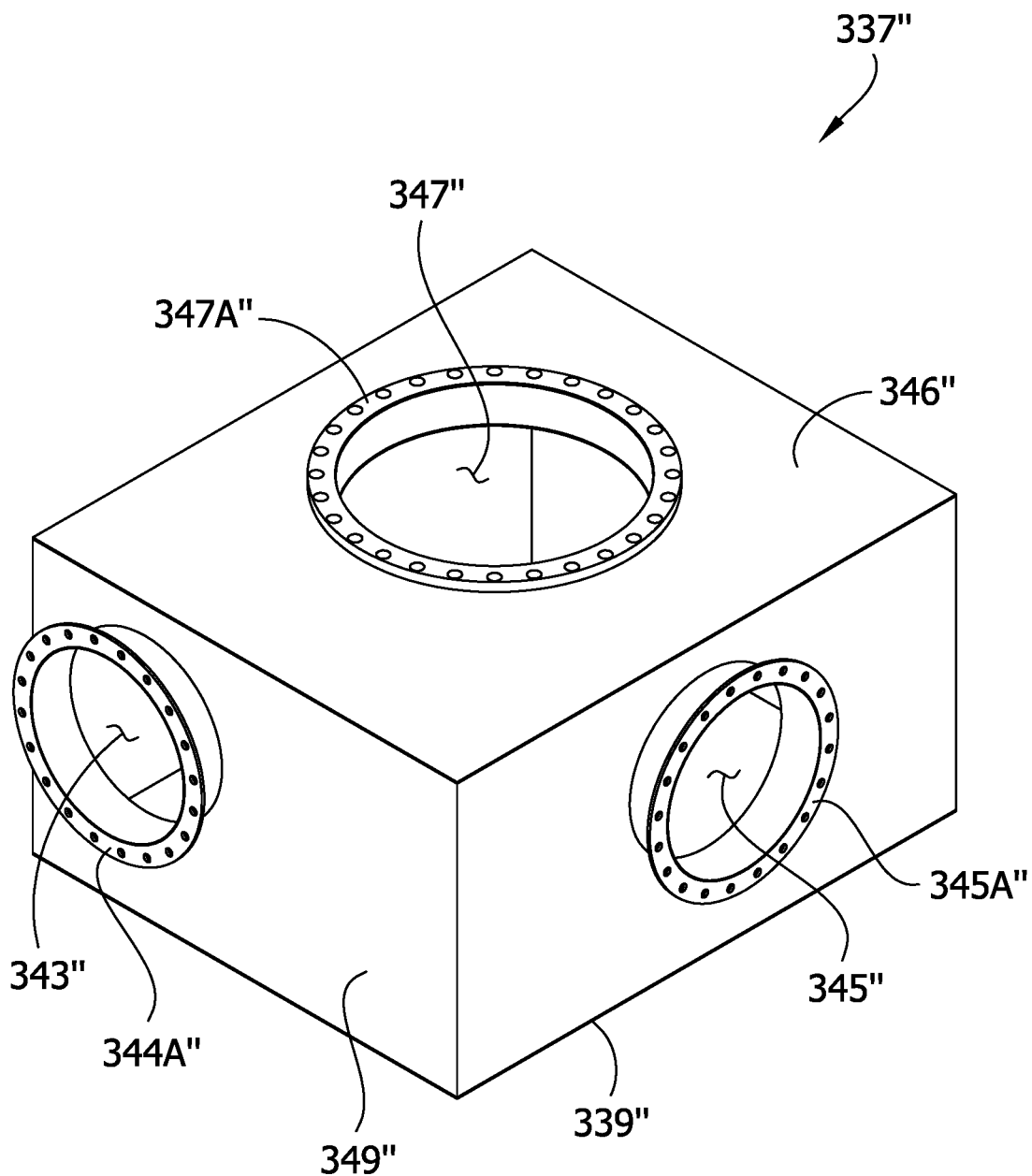
FIG. 9A is a perspective of another exhaust mixer.
Figure 9B:
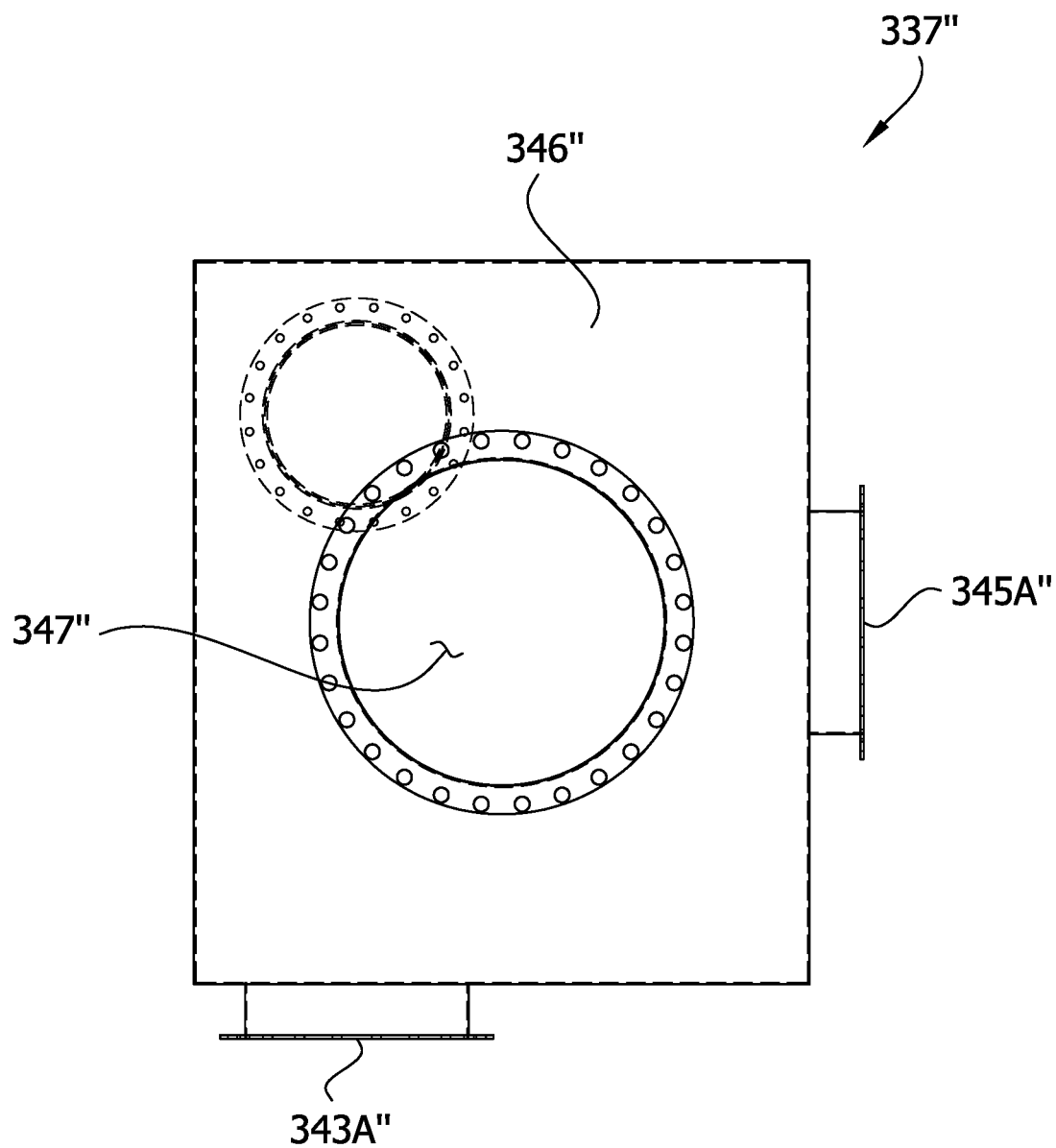
FIG. 9B is a top plan view of the exhaust mixer of FIG. 9A.
Figure 9C:
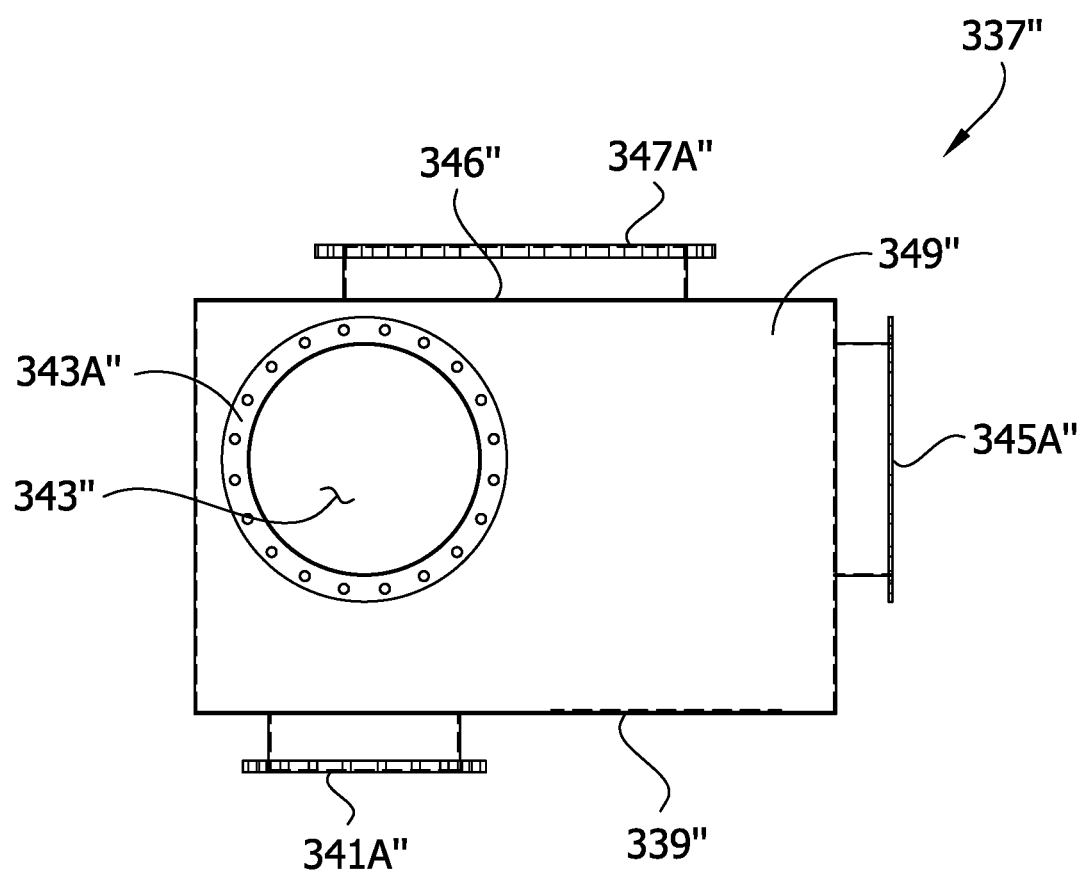
FIG. 9C is a side elevation of the exhaust mixer of FIG. 9A.
Figure 9D:
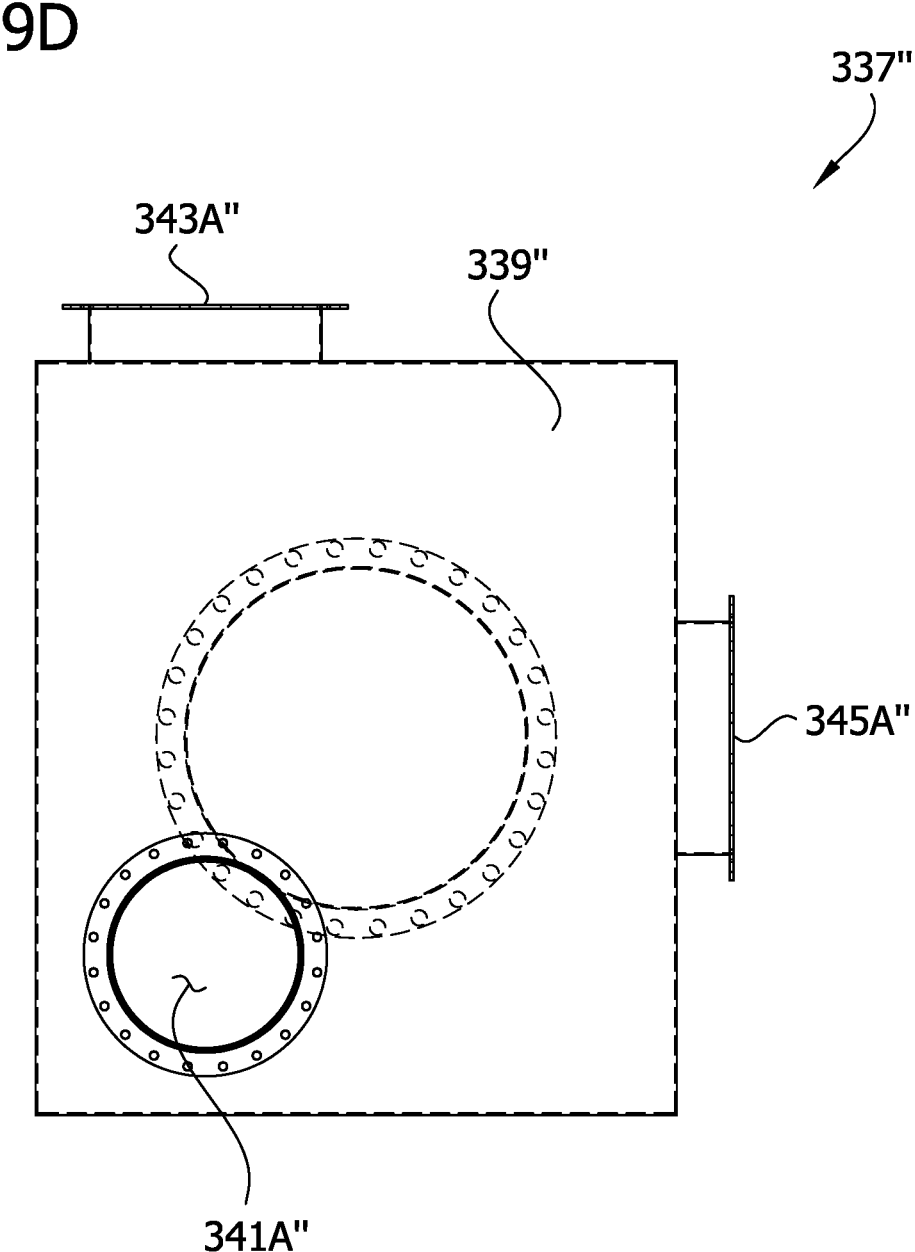
FIG. 9D is a bottom plan view of the exhaust mixer of FIG. 9A.

A portion of another scrubber system 11" is shown in FIG. 5. Parts of the scrubber system 11" corresponding to the parts of the scrubber system 11 shown in FIG. 1 will be designated by the same reference numerals with the addition of a double prime. In this embodiment, an exhaust mixer 37" is spaced away and offset from the inlet fitting 33" of the scrubber 29". The exhaust mixer 37" is connected to the exhaust pipes 21", 23", 25" as described above in relation to the scrubber system 11 of FIG. 1. The location of the exhaust mixer 37" may be necessitated by the available space and relative locations of the scrubber 29" and the engines (not shown). It will be understood that the exhaust mixer 37" could have a different orientation. The exhaust mixer 37" can be connected to the inlet fitting 33" of the scrubber 29" by a connecting pipe 131. The pipe is configured for connection at a first end to the scrubber 29" in fluid communication with the inlet of scrubber. A second end of the pipe 131 is connected to the exhaust mixer 37'' in fluid communication with the outlet of the exhaust mixer.

Figure 11:
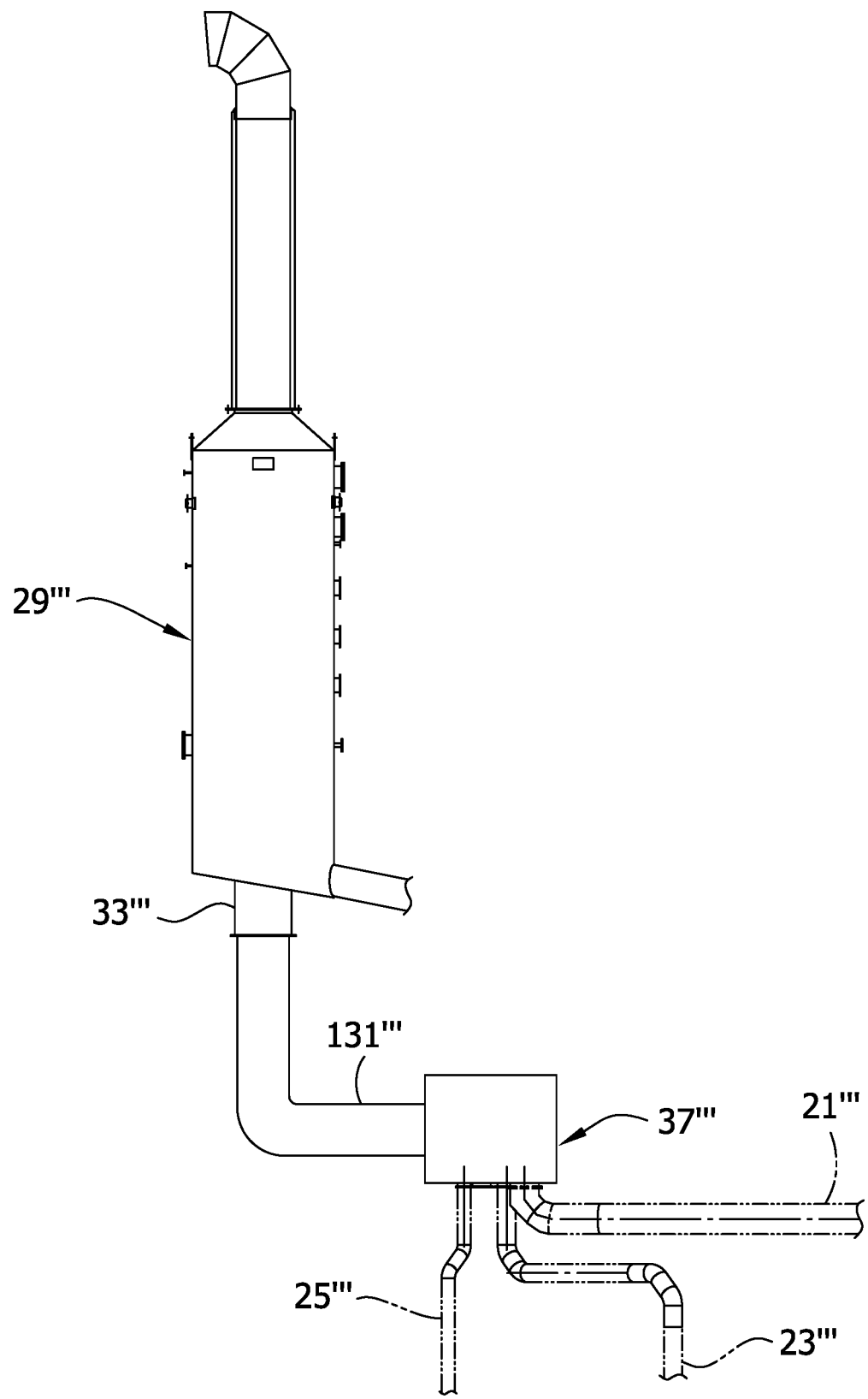
FIG. 11 is an elevation view showing a scrubber system having a different arrangement of a scrubber and exhaust mixer.

A portion of another scrubber system 11''' is shown in FIG. 11. Parts of the scrubber system 11''' corresponding to the parts of the scrubber system 11 shown in FIG. 1 will be designated by the same reference numerals with the addition of a triple prime. Like in the scrubber system 11'', the exhaust mixer 37''' of the scrubber system 11''' is spaced away from the inlet of the scrubber 29''. Three inlets are formed in the bottom end of the mixer 37''' for connecting the mixer to the exhaust pipes 21''', 23'', 25''' as described above. The inlets could also be formed in the top end or any of the sides of the mixer without departing from the scope of the invention. Unlike the mixer 37, the outlet of the mixer 37''' is formed in a side wall of the mixing vessel. A connecting pipe 131''' fluidly connects the exhaust mixer 37''' to the inlet fitting 33''' of the scrubber 29''.

It will be understood that the scrubber systems 11, 11', 11'', 11''' are exemplary only. The systems may take other forms, including a hybrid system capable of operating in both an open and a closed loop manner.

Figure 4A:
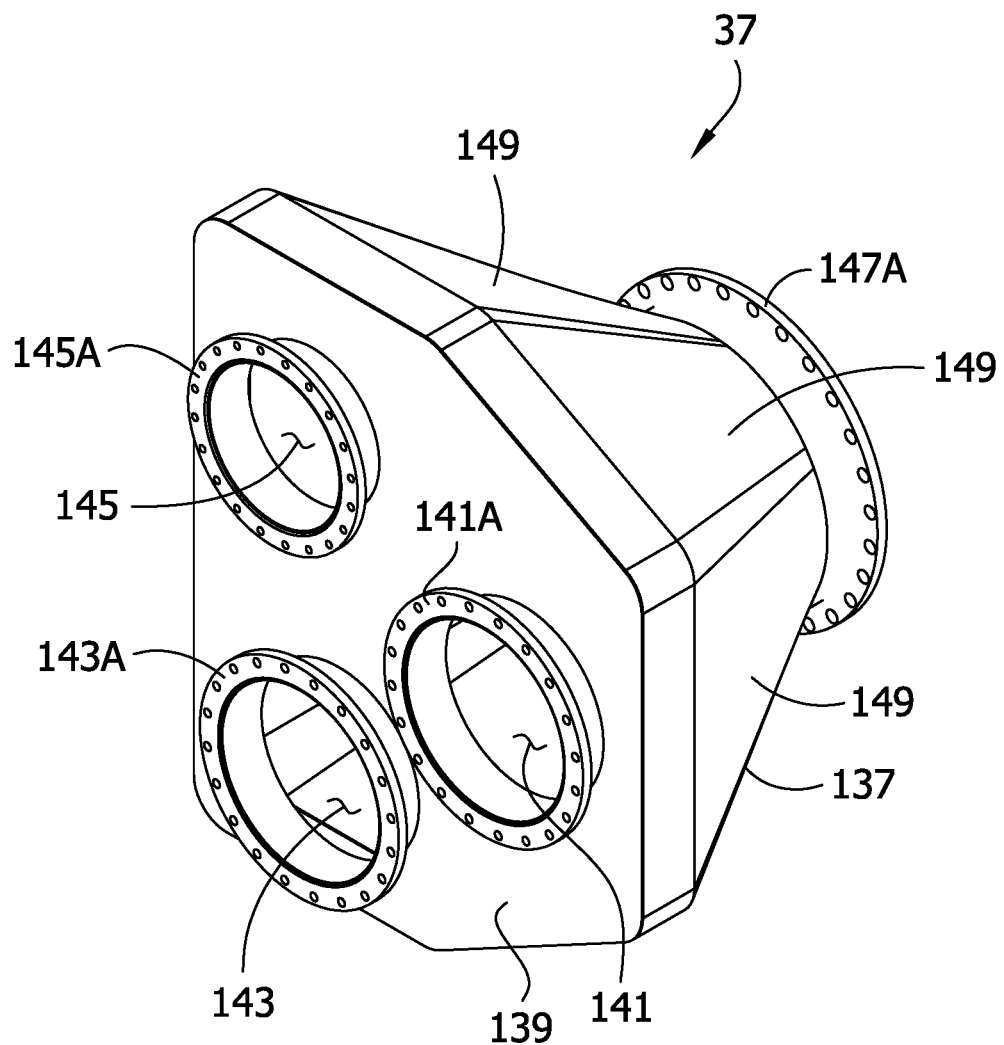
FIG. 4A is a perspective of an exhaust mixer of the scrubber system.
Figure 4B:
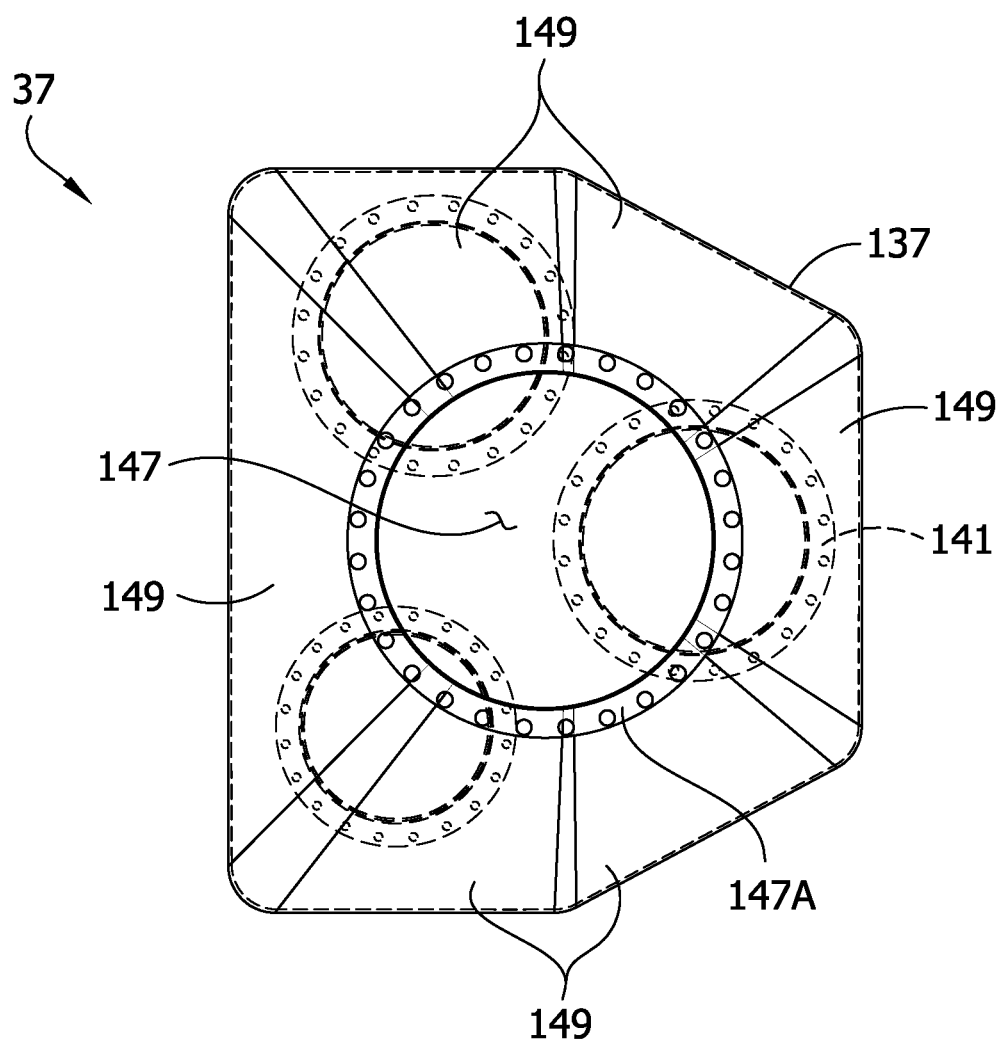
FIG. 4B is a top plan view of the exhaust mixer.
Figure 4C:
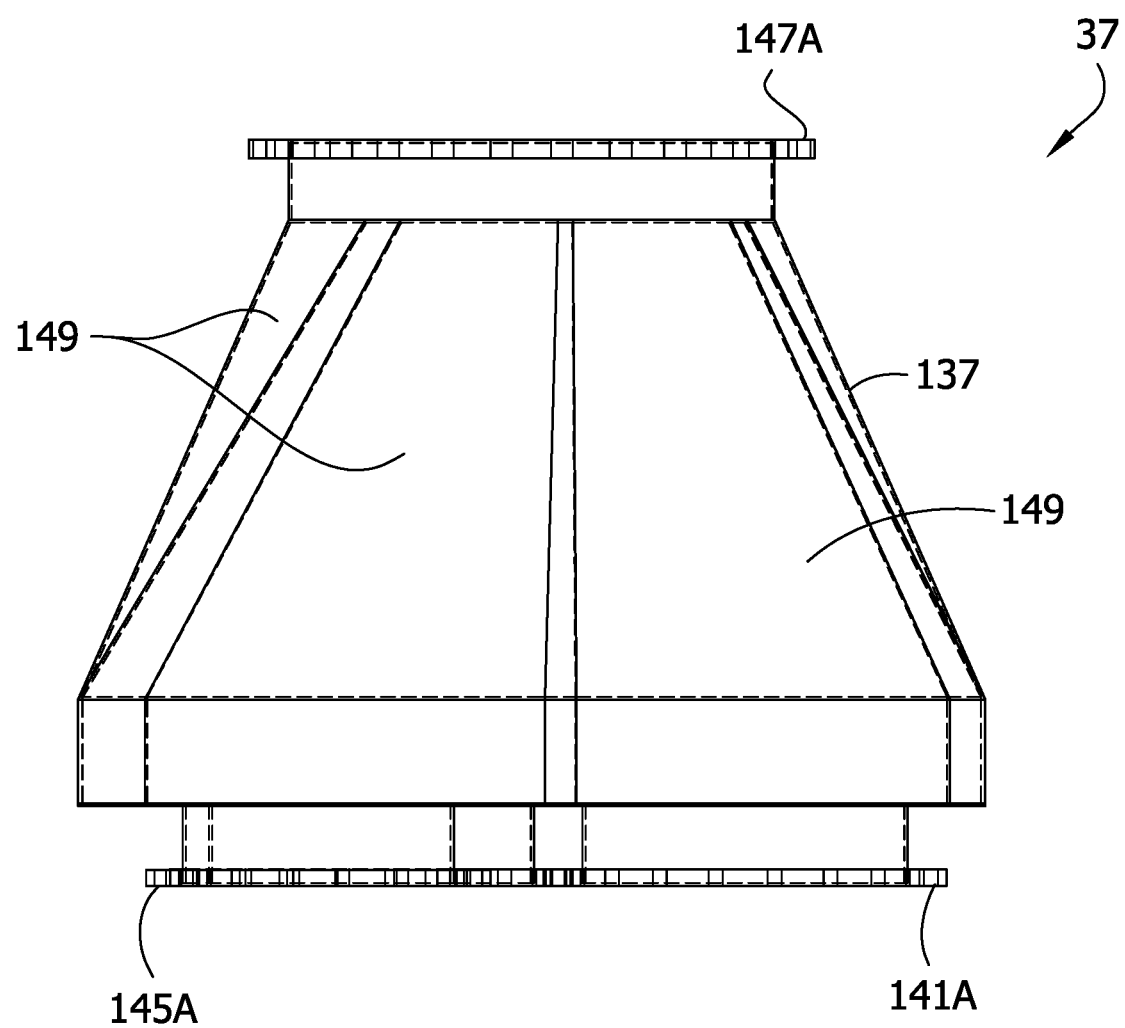
FIG. 4C is a side elevation of the exhaust mixer.
Figure 4D:
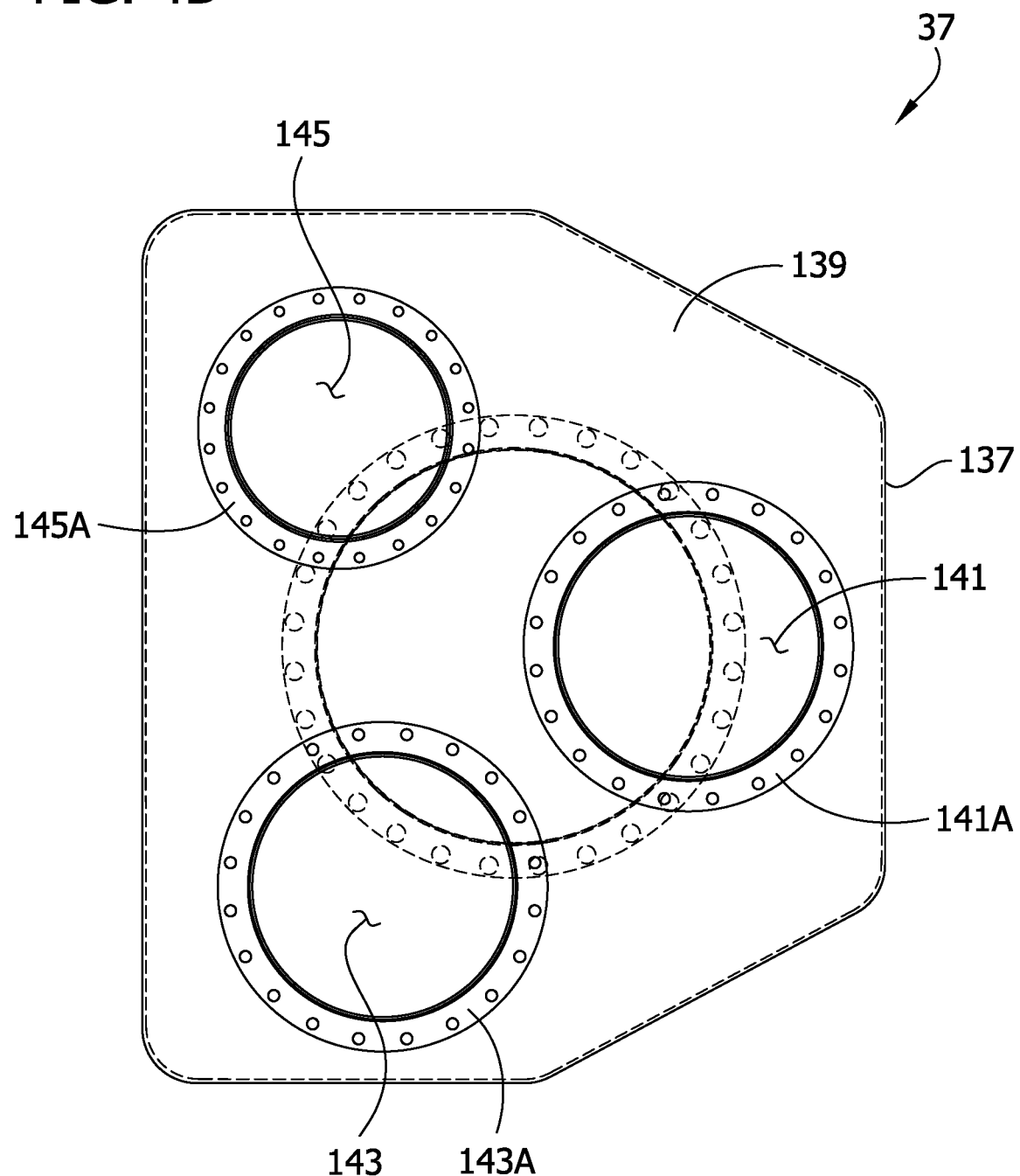
FIG. 4D is a bottom plan view of the exhaust mixer.

Referring again to FIG. 1, the exhaust mixer 37 is attached directly to the inlet fitting 33 of the scrubber 29. In this way, all gas entering the scrubber 29 does so in a (vertical) direction parallel to the gas flow through the scrubber. As shown in FIG. 1, the direction of exhaust gas leaving the exhaust mixer 37 is generally coincident with a longitudinal axis of the scrubber 29. However, the exhaust mixer 37 could be spaced from the scrubber 29 and connected to the inlet fitting 33 by another pipe such as is shown for the scrubber system 11'' of FIG. 5. In fact, the exhaust mixer 37 can be placed substantially at any location within the ship S. As shown in FIGS. 4A-4B, the exhaust mixer 37 includes a mixing vessel 137 defining an internal volume for mixing exhaust gas from the engines 15, 17, 19. The mixing vessel 137 includes an inlet wall 139 defining a first inlet 141 for the exhaust gas from the main engine 15, a second inlet 143 for the exhaust gas from the first auxiliary engine 17 and a third inlet 145 for the exhaust gas from the second auxiliary engine 19. Each of the inlets 141, 143, 145 has an associated collar 141A, 143A, 145A for connecting to a respective one of the pipes 21, 23, 25 leading from the engines 15, 17, 19. In the illustrated embodiment, the collars 141A, 143A, 145A are configured to form a bolted connection, bout the inlets 141, 143, 145 can be connected to the pipes 21, 23, 25 in other ways (e.g., using welds or other types of fasteners, etc.) without departing from the scope of the invention. It will be understood that the number and arrangement of the inlets may be other than described within the scope of the present invention. In other words, there may be 1, 2, 4, 5 or more inlets in the inlet wall 139. The mixing vessel 137 defines an outlet 147 on the side of the mixing vessel opposite the inlet wall 139. The outlet 147 has an associated collar 147A that in the illustrated embodiment is attached directly to the inlet fitting 33 of the scrubber 29. Side walls 149 extend between the inlets 141, 143, 145 and the outlet 147. The single outlet 147 of the mixing vessel 137 allows the mixing vessel to be attached to the scrubber 29 without modification to the scrubber. It will be understood that the mixing vessel 10 can be modified in ways (not shown) to work with the number of distinct exhaust gas sources and available space, as required. For example and without limitation, one or more of the inlets could be formed in the side walls as discussed below. Still further, the exhaust mixer can be constructed so that the inlets lie in different planes and angles to accommodate receiving the exhaust pipes as needed for construction. In that case there may be more than one inlet wall.

The mixing vessel 137 tapers from the inlet wall 139 to the outlet collar 147A. As shown, the mixing vessel has a roughly hexagonal pyramid shape. Each of six side walls 149 slants inward from their intersection with the inlet wall 139 to the intersection with the outlet collar 147A. The interior volume of the mixing vessel 137 tapers in the same way as the walls 149 toward the outlet 147. The tapering is configured to promote mixing of the exhaust gases from the engines 15, 17, 19 to the extent that the exhaust flow leaving the mixing vessel 137 is a combined flow stream substantially uniform in composition as well as temperature. Mixing occurs without regard to the number of engines 15, 17, 19 operating. It will be understood that the mixing vessel 137 may have other configurations (not shown) within the scope of the present invention.

For example, referring to FIGS. 6A-6D, in one embodiment, a mixing vessel 237 has an exterior that has a generally conical shape, instead of a pyramidal shape, to promote mixing. The mixing vessel 237 includes a generally circular inlet wall 239 defining first, second, and third inlets 241, 243, 245 having associated collars 241A, 243A, 245A for connecting to the pipes 21, 23, 25 leading from the engines 15, 17, 19. The mixing vessel 237 also defines a single outlet 247 on an opposite side of the mixing vessel from the inlet wall 239 that has an associated outlet collar 247A. A side wall 249 having a generally conical shape extends from the generally circular inlet wall 239 to the generally circular outlet 247 to define a generally conical mixing chamber to promote mixing within the mixing vessel 237 and funnel the mixed gas streams through the outlet into the inlet fitting 33 of the scrubber 29 or into another conduit leading to the scrubber.

Referring to FIGS. 7A-7D, in another embodiment, a mixing vessel 337 has an exterior that is untapered. Like the mixing vessel 137, the mixing vessel 337 includes an inlet wall 339 defining first, second, and third inlets 341, 343, 345 having associated collars 341A, 343A, 345A for connecting to a respective one of the pipes 21, 23, 25 leading from the engines 15, 17, 19. Unlike the mixing vessel 137, the mixing vessel 337 has an outlet wall 346 oriented generally parallel to the inlet wall 339 and having a substantially similar size and shape to the inlet wall. In the illustrated embodiment, each of the inlet and outlet walls 339, 346 has a rectangular shape. Four side walls 349 extend from respective side edges of the inlet wall 339 to corresponding side edges of the outlet wall 346 to enclose the space between the inlet and outlet walls. A single outlet 347 having an associated collar 347A is formed in the outlet wall to fluidly couple the mixing vessel 337 to the inlet fitting 33 of the scrubber 29.

Referring to FIGS. 8A-8E, in one or more embodiments, a mixing vessel 337' (such as, without limitation, a mixing vessel having side walls 349' that are untapered) includes one or more interior mixing structures 350' constructed to promote mixing. Any suitable internal mixing structure may be used without departing from the scope of the invention. In the illustrated embodiment, the mixing vessel 337' includes a plurality of mixing vanes 350' that are arranged in the interior of the mixing vessel to mix the plural gas streams entering through the inlets 341', 343', 345' before being discharged through the outlet 347'. Each mixing vane 350' extends from an inlet end adjacent the inlet wall 339' to an outlet end adjacent the outlet wall 346'. The vanes 350' may be held in position by being fastened at their ends to the inlet and outlet walls 339', 346' or by using any other suitable supports. The inlet end of each mixing vane 350' is positioned outboard of one or more of the respective inlets 341', 343', 345', and the vanes each slant inward as they extend toward their outlet ends. The outlet ends of the vanes 350' are each located radially adjacent and outboard of the outlet 347. In the illustrated embodiment there are six vanes 250' that are circumferentially spaced apart from one another about a flow axis FA (FIG. 8C) extending between the inlet and outlet walls 339', 346' through the outlet 347'.

Each vane 350' suitably comprises a rigid or semi-rigid sheet of material with a major inner surface that faces radially inward toward the gas streams entering the inlets 341', 343', 345'. Thus, it can be seen that the illustrated vanes 350' form a generally hexagonal pyramidal funneling structure inside of the mixing vessel 237', which funnels portions of the gas streams from the inlets 341', 343', 345' toward the outlet 347'. But unlike the hexagonal pyramidal side walls 149 of the mixing vessel 137, gaps 352' extend between the side edges of the vanes 350' to allow portions of the gas streams to pass into and out of the funneling structure provided by the vanes to promote further mixing by generating additional turbulence. That is, portions of the gas streams are directed through the gaps 352' around the vanes 350' to the exterior of the funneling structure where additional mixing occurs before flowing back into the funneling structure through the gaps and through the outlet 347'. A transverse fin 350A' is mounted on the outer surface of each of the vanes 350'. Each fin 350A' extends along the outer surface of the respective vane 350' from an inlet end adjacent the inlet wall 339' to an outlet end adjacent the outlet wall 346'. The fins 350A' further promote mixing of the gasses that flow through the gaps 352' to the exterior of the funneling structure defined by the vanes 350'. It will be understood that other numbers and arrangements of vanes, baffles, and the like may be used in other embodiments.

Referring to FIGS. 9A-9D, in still another embodiment of an exhaust mixing vessel 337", one or more of the inlets 343", 345" are formed in side walls 349" of the mixer instead of a bottom wall 339" opposite the outlet wall 346". In the illustrated embodiment, a first inlet 341" having an associated collar 341A" is formed in the bottom wall 339", a second inlet 343" having an associated collar 343A" is formed in a first side wall 349", and a third inlet 345" having an associated collar 345A" is formed in an second adjacent side wall. The bottom wall 339" and the first and second side walls 249" are each, therefore, "inlet walls" in the illustrated embodiment. The gas stream from, for example, the pipe 21 may flow vertically through the first inlet 341" into the mixing vessel 337", while the gas streams from the pipes 23, 25 flow horizontally in transverse directions through the second and third inlets 343", 345", respectively. The three gas streams intersect in the middle of the mixing vessel 337", where they mix before flowing out of the mixing vessel through the outlet 347". Still other arrangements providing one or more inlets and/or an outlet on a side wall of an exhaust mixer are also possible without departing from the scope of the invention.

Figure 10A:
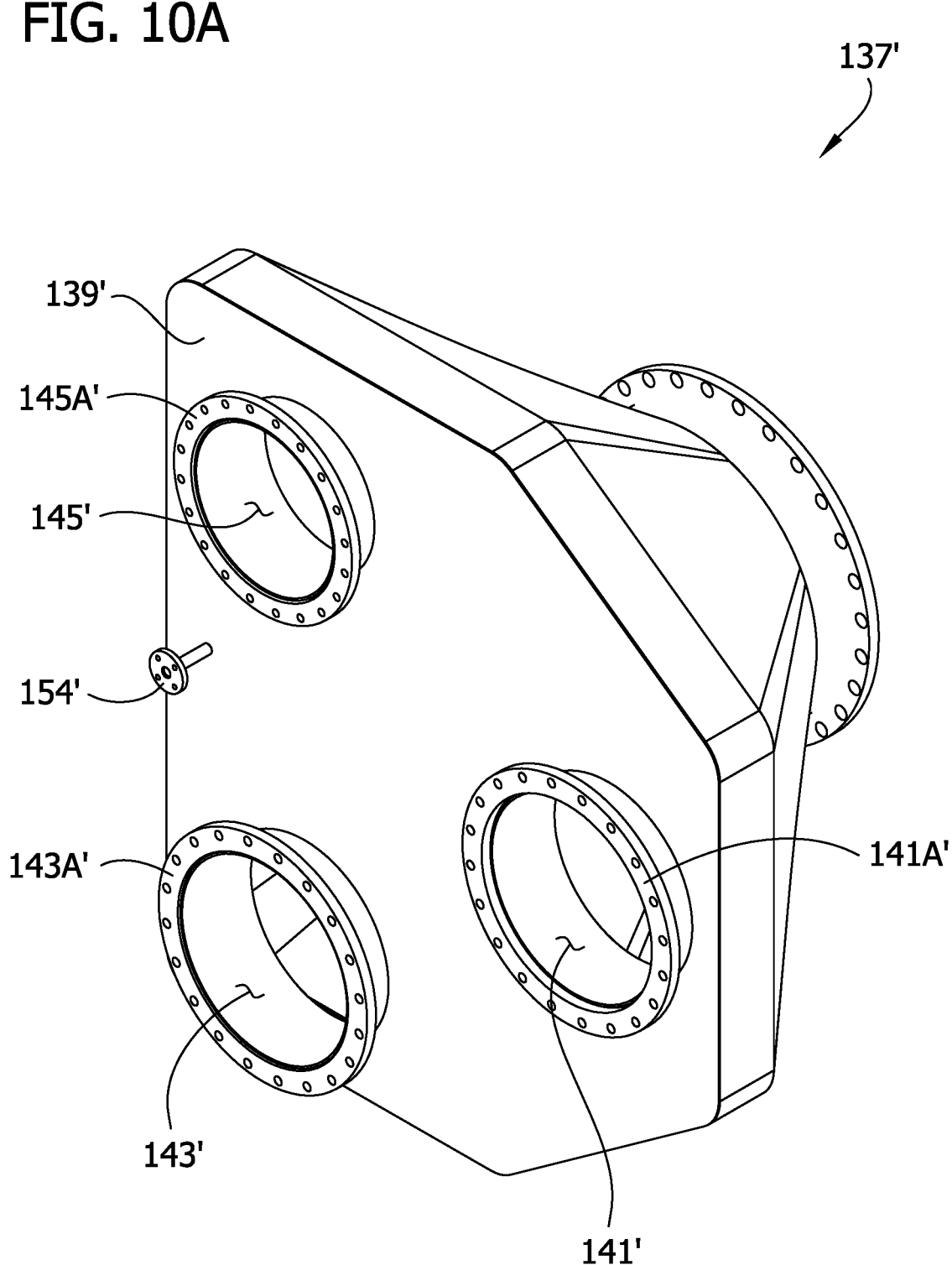
FIG. 10A is a perspective of another exhaust mixer.
Figure 10B:
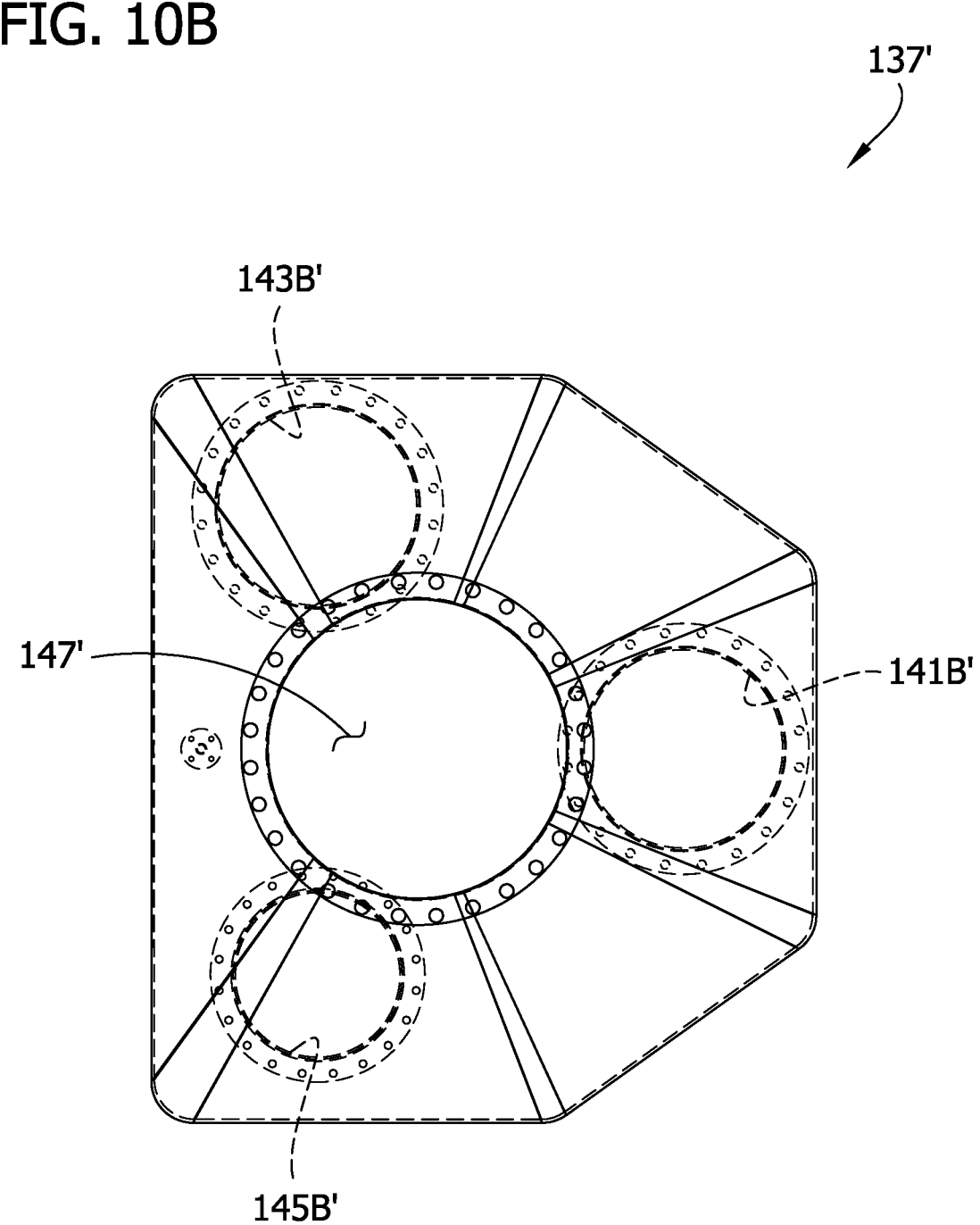
FIG. 10B is a top plan view of the exhaust mixer of FIG. 10A.
Figure 10D:
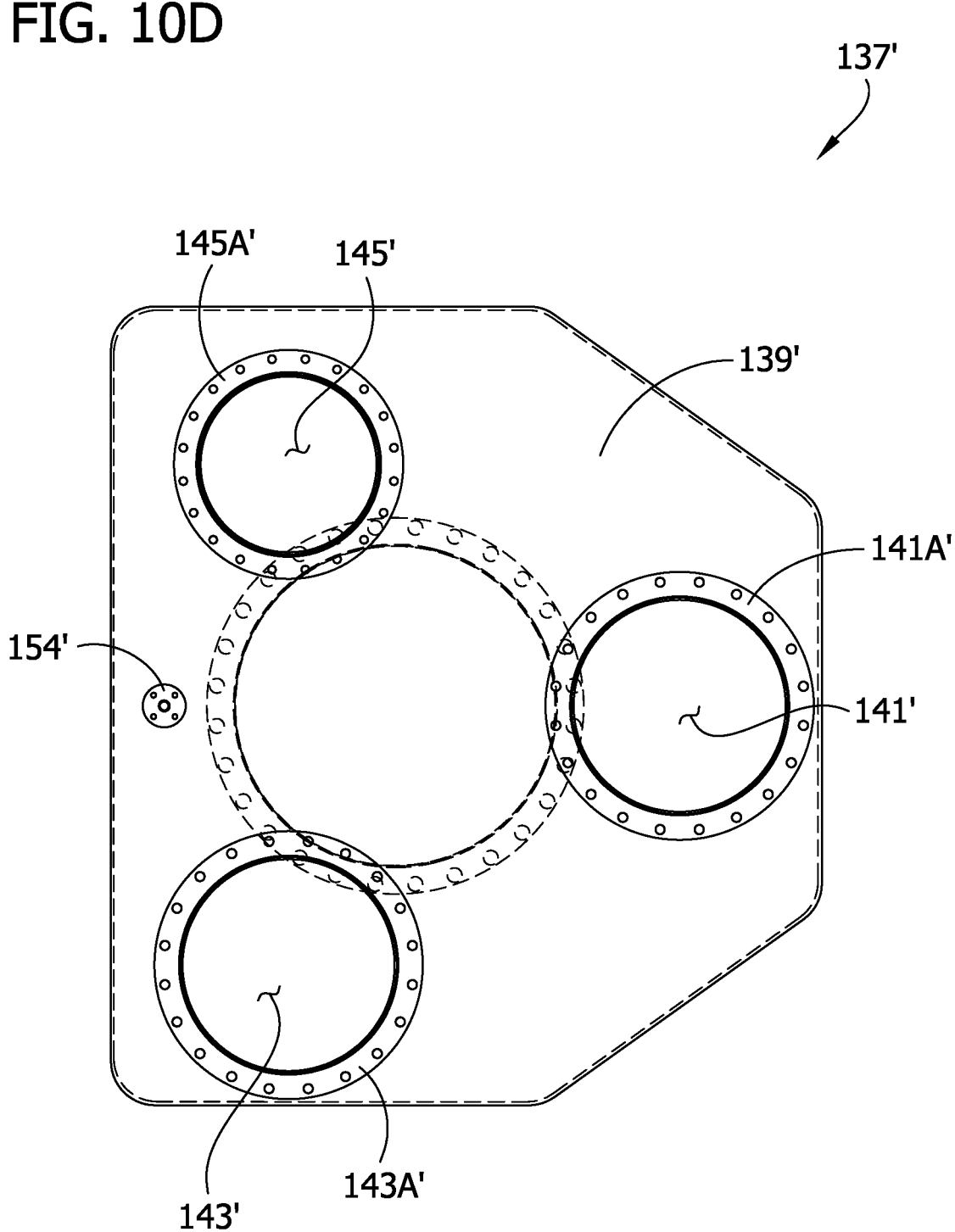
FIG. 10D is a bottom plan view of the exhaust mixer of FIG. 10A.

The exhaust mixer 37 may also be constructed to capture liquid that might escape the scrubber 29 through the inlet fitting 33 and prevent it from getting to the engines 15, 17, 19 or other equipment where it could cause damage. For example, any of the mixing vessels 137, 237, 337, 337', 337" may be equipped with a drain (not shown) to remove captured liquid from the interior of the mixing vessel. In another embodiment illustrated in FIGS. 10A-10D, each of the inlets 141', 143', 144' of the mixing vessel 137' has an associated collar 141A', 143A', 145A' and a respective defining tubular barrier 141B', 143B', 145B' that protrudes inward from the inlet wall 139' into the volume of the exhaust mixer interior. A drain 154' is provided at the lowest point on the inlet wall 139' to drain any liquid that collects on the inner side of the inlet wall. In the illustrated embodiment, the inlets 141', 143', 145' are arranged so any water coming down from the outlet 147' from the scrubber falls down into a central region of the mixing vessel 137' between the tubular structures 141B', 143B', 145B' and not into the inlets 141', 143', 145'. That is, as shown in FIGS. 10B and 10D no portion of any of the inlets 141', 143', 144' is directly beneath any portion of the outlet 147'. Thus, the inlets 141', 143', 144' are offset from the outlet 147' so there is no direct path for water to flow from the outlet to the inlets. The barriers 141B', 143B', 145B' prevent any liquid on the interior of the bottom wall 139" from flowing into the openings 141', 143', 145'. In other embodiments, structure such as baffles may be provided to inhibit the flow of liquid from the outlet of a mixing vessel into one or more of the inlets.

The exhaust mixer 37 of the scrubber system 11 gives the system great flexibility in installation. For example in the ship S, space and particularly space within the funnel F is at a premium. Where the scrubber system 11 is being retrofit into an existing ship, there is no real option to reconfigure the ship to accommodate the scrubber system 11. For example, the tall and slender scrubber 29 may be readily accommodated in the funnel, but additional piping to route the exhaust gas to the inlet fitting 33 is not easily accommodated. For instance, there may not be enough space to connect multiple different exhaust pipes at different locations around the scrubber 29 or at one location on the side of the scrubber. In new ship construction, the provision of the scrubber system 11 allowing for exhaust to enter from below allows the funnel F to be made a small as possible, reducing wind resistance, reducing weight and maximizing cargo (and/or passenger) space. The exhaust mixer 37 and associated piping can be located below the funnel F, keeping much of the weight of the scrubber system 11 lower in the ship S. Also, the exhaust mixer 37 can be oriented in almost any position to fit in the space allotted. However, by collecting the exhausts from the engines 15, 17, 19 and delivering them from below to the inlet fitting 33 of the scrubber 29, in general the path of the exhaust gas will have very few turns. This helps to keep pressure drop in the system low. The pressure drop is low enough that no fans are required to pull exhaust gas through the scrubber, saving power expenditure onboard. Still further, where the scrubber 29 is used to service multiple sources of exhaust gas, such as engines 15, 17, 19, operation is believed to be improved by mixing in the exhaust mixer so that the exhaust gas entering the scrubber 29 through the inlet fitting 33 is substantially uniform in composition and temperature. Temperature stratification in the scrubber 29 could occur, for example, in the situation where the temperature of exhaust gas from the main engine 15 is much hotter (e.g., 380°) than the temperature of the exhaust gas coming from the first auxiliary engine 17 (e.g., 220°). In the absence of mixing, this can cause water in the scrubber 29 to evaporate at different rates and lead to different levels of $SO_2$ absorption in different areas of the scrubber.

Having described the invention in detail, it will be apparent that modifications and variations are possible without departing from the scope of the invention defined in the appended claims.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A scrubber system for receiving and cleaning exhaust gas from different engines, the scrubber system comprising:
a wet scrubber for removing at least one constituent from the exhaust gas, the wet scrubber including a housing having an inlet for receiving exhaust gases into the wet scrubber, and an outlet for discharging cleaned exhaust gas from the wet scrubber;
an exhaust mixer having plural inlets configured to receive exhaust gas from the different engines at a location remote from each of the different engines into the exhaust mixer, and an outlet for discharging exhaust gas from the exhaust mixer, the exhaust mixer outlet being configured for connection in fluid communication with the inlet of the wet scrubber for delivering exhaust gas from the exhaust mixer into the wet scrubber, the exhaust mixer being configured to mix the exhaust gases entering through the inlets into a combined flow stream exiting the exhaust mixer outlet;
wherein the exhaust mixer comprises at least one of:
internal baffles for mixing the exhaust gases passing through the exhaust mixer;
internal vanes for mixing the exhaust gases passing through the exhaust mixer; and
a housing comprising a perimeter wall that tapers as it extends longitudinally from adjacent the inlets toward the exhaust mixer outlet such that a cross-sectional area of the housing progressively decreases toward the exhaust mixer outlet along a longitudinal span of the perimeter wall;
wherein the scrubber housing is elongate, the inlet of the scrubber housing being located at a first longitudinal end of the scrubber housing and the outlet of the scrubber housing being located at a second, opposite longitudinal end of the scrubber housing;
wherein the exhaust mixer is configured so that the combined flow stream exiting the exhaust mixer outlet is directed along an axis that is parallel to or coincident with a longitudinal axis of the scrubber housing;
wherein the exhaust mixer has a first end portion adjacent the plural inlets, an opposite second end portion through which the outlet opens to the exhaust mixer, and an axis extending from the first end portion to the second end portion; and
wherein the axis of the exhaust mixer is parallel to or coincident with the longitudinal axis of the scrubber housing.

2. The scrubber system as set forth in claim 1 wherein the exhaust mixer is directly connected to the wet scrubber.

3. The scrubber system as set forth in claim 1 further comprising a pipe configured at a first end of the pipe for connection to the wet scrubber in fluid communication with the inlet of the wet scrubber and configured for connection at a second end of the pipe to the exhaust mixer in fluid communication with the outlet of the exhaust mixer.

4. The scrubber system as set forth in claim 1 wherein the wet scrubber is an in-line scrubber.

5. The scrubber system as set forth in claim 1 wherein the inlets are offset from a projection of the outlet through the exhaust mixer.

6. The scrubber system as set forth in claim 1 wherein the exhaust mixer comprises a drain positioned to drain liquids out of the exhaust mixer.

7. The scrubber system as set forth in claim 1 wherein the inlet of the scrubber housing extends into the interior of the scrubber housing and opens in the interior at a mouth.

8. The scrubber system as set forth in claim 1 wherein the exhaust mixer comprises the internal baffles for mixing the exhaust gases passing through the exhaust mixer.

9. The scrubber system as set forth in claim 1 wherein the exhaust mixer comprises the internal vanes for mixing the exhaust gases passing through the exhaust mixer.

10. The scrubber system as set forth in claim 1:
wherein the exhaust mixer comprises the housing comprising the perimeter wall that tapers as it extends longitudinally from adjacent the inlets toward the exhaust mixer outlet such that a cross-sectional area of the housing progressively decreases toward the exhaust mixer outlet along a longitudinal span of the perimeter wall; and
wherein the perimeter wall extends longitudinally along the axis of the exhaust mixer.

11. A method of providing a marine vessel with a scrubber system for cleaning exhaust gases from distinct engines, the method comprising:
placing an in-line wet scrubber in a funnel of the marine vessel, wherein the in-line wet scrubber extends longitudinally along a scrubber axis from an inlet end to an outlet end;
locating an exhaust mixer in the marine vessel at a location below the in-line wet scrubber such that the scrubber axis intersects the exhaust mixer;
connecting the exhaust mixer to an inlet of the wet scrubber that opens through a floor of the wet scrubber on which liquid is collected during use of the wet scrubber;
connecting exhaust pipes from distinct engines to the exhaust mixer; and
directing exhaust from the distinct engines to flow generally vertically through the inlet into the wet scrubber after flowing from the exhaust pipes through the exhaust mixer.

12. The method as set forth in claim 11 wherein locating the exhaust mixer comprises locating the exhaust mixer outside of the funnel of the marine vessel.

13. The method as set forth in claim 11 wherein connecting the exhaust mixer to the inlet of the wet scrubber comprises mounting the exhaust mixer on the wet scrubber at the inlet of the wet scrubber.

14. The method as set forth in claim 11 wherein connecting the exhaust mixer to the inlet of the wet scrubber comprises attaching a pipe to an outlet of the exhaust mixer and attaching the pipe to the inlet of the wet scrubber.

15. The method as set forth in claim 11 wherein locating the exhaust mixer comprises orienting the exhaust mixer to fit the space available for the exhaust mixer in the marine vessel.

16. A scrubber system for receiving and cleaning exhaust gas from different engines, the scrubber system comprising:
a wet scrubber for removing at least one constituent from the exhaust gas, the wet scrubber including a housing having an inlet for receiving exhaust gases into the wet scrubber, and an outlet for discharging cleaned exhaust gas from the wet scrubber;
an exhaust mixer having plural inlets configured to receive exhaust gas from the different engines at a location remote from each of the different engines into the exhaust mixer, and an outlet for discharging exhaust gas from the exhaust mixer, the exhaust mixer outlet being configured for connection in fluid communication with the inlet of the wet scrubber for delivering exhaust gas from the exhaust mixer into the wet scrubber, the exhaust mixer being configured to mix the exhaust gases entering through the inlets into a combined flow stream exiting the exhaust mixer outlet;

wherein the exhaust mixer comprises at least one of:
- internal baffles for mixing the exhaust gases passing through the exhaust mixer;
- internal vanes for mixing the exhaust gases passing through the exhaust mixer; and
- a housing comprising a perimeter wall that tapers as it extends longitudinally from adjacent the inlets toward the exhaust mixer outlet such that a cross-sectional area of the housing progressively decreases toward the exhaust mixer outlet along a longitudinal span of the perimeter wall;

wherein the inlet of the scrubber housing extends into the interior of the scrubber housing and opens in the interior at a mouth; and wherein the bottom of the scrubber housing has a slanted floor that is located below the mouth of the inlet.

17. The scrubber system as set forth in claim 16 wherein the exhaust mixer is directly connected to the wet scrubber.

18. The scrubber system as set forth in claim 16 wherein the exhaust mixer comprises a drain positioned to drain liquids out of the exhaust mixer.

19. The scrubber system as set forth in claim 16 wherein the exhaust mixer comprises the internal baffles for mixing the exhaust gases passing through the exhaust mixer.

20. The scrubber system as set forth in claim 16 wherein the exhaust mixer comprises the internal vanes for mixing the exhaust gases passing through the exhaust mixer.

* * * * *

UNITED STATES PATENT AND TRADEMARK OFFICE
CERTIFICATE OF CORRECTION

PATENT NO. : 10,814,275 B2
APPLICATION NO. : 15/322898
DATED : October 27, 2020
INVENTOR(S) : Patterson et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 148 days.

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*